United States Patent
Figueroa-Alvarez et al.

(10) Patent No.: US 11,861,851 B2
(45) Date of Patent: Jan. 2, 2024

(54) ANATOMICAL AND FUNCTIONAL ASSESSMENT OF CAD USING MACHINE LEARNING

(71) Applicants: THE REGENTS OF THE UNIVERSITY OF MICHIGAN, Ann Arbor, MI (US); KING'S COLLEGE LONDON, London (GB)

(72) Inventors: Carlos Alberto Figueroa-Alvarez, Ann Arbor, MI (US); Christopher John Arthurs, Newcastle upon Tyne (GB); Brahmajee Kartik Nallamothu, Ann Arbor, MI (US); Kritika Iyer, Ann Arbor, MI (US); Raj Rao Nadakuditi, Ann Arbor, MI (US); Krishnakumar Garikipati, Ann Arbor, MI (US); Elizabeth Renee Livingston, Ann Arbor, MI (US)

(73) Assignees: REGENTS OF THE UNIVERSITY OF MICHIGAN, Ann Arbor, MI (US); KING'S COLLEGE LONDON, London (GB)

( * ) Notice: Subject to any disclaimer, the term of this patent is extended or adjusted under 35 U.S.C. 154(b) by 0 days.

(21) Appl. No.: 17/861,100

(22) Filed: Jul. 8, 2022

(65) Prior Publication Data
US 2022/0366571 A1 Nov. 17, 2022

Related U.S. Application Data

(63) Continuation of application No. 17/101,550, filed on Nov. 23, 2020, now Pat. No. 11,386,563.
(Continued)

(51) Int. Cl.
*G06K 9/00* (2022.01)
*G06T 7/215* (2017.01)
(Continued)

(52) U.S. Cl.
CPC .............. *G06T 7/215* (2017.01); *G06N 3/084* (2013.01); *G06T 5/002* (2013.01); *G06T 7/277* (2017.01);
(Continued)

(58) Field of Classification Search
CPC .............................. G06T 7/0012–0016; G06T 2207/10064–10136;
(Continued)

(56) References Cited

U.S. PATENT DOCUMENTS 8,977,339 B1 * 3/2015 Wu ...................... A61B 5/0044
600/407
2012/0041318 A1 2/2012 Taylor
(Continued)

FOREIGN PATENT DOCUMENTS

CN 108665449 A 10/2018

OTHER PUBLICATIONS

Adjoua et al., Reduced-order modeling of hemodynamics across macroscopic through mesoscopic circulation scales, Cornell University Library, 19 pages (2019).
(Continued)

*Primary Examiner* — Atiba O Fitzpatrick
(74) *Attorney, Agent, or Firm* — MARSHALL, GERSTEIN & BORUN LLP

(57) ABSTRACT

Anatomical and functional assessment of coronary artery disease (CAD) using machine learning and computational modeling techniques deploying methodologies for non-invasive Fractional Flow Reserve (FFR) quantification based on angiographically derived anatomy and hemodynamics data, relying on machine learning algorithms for image segmentation and flow assessment, and relying on accurate physics-based computational fluid dynamics (CFD) simulation for computation of the FFR.

20 Claims, 13 Drawing Sheets
(9 of 13 Drawing Sheet(s) Filed in Color)

Related U.S. Application Data

(60) Provisional application No. 62/939,370, filed on Nov. 22, 2019.

(51) Int. Cl.
*G06T 7/277* (2017.01)
*G06N 3/084* (2023.01)
*G06T 5/00* (2006.01)

(52) U.S. Cl.
CPC ............... *G06T 2207/10072* (2013.01); *G06T 2207/20081* (2013.01); *G06T 2207/20084* (2013.01); *G06T 2207/30104* (2013.01)

(58) Field of Classification Search
CPC ... G06T 2207/30004–30104; G06T 2211/404; G06T 2207/20044; G06T 3/0037; G06T 2207/20081; G06T 2207/20084; G06T 7/10–194; G06T 2207/20021; G06T 2207/20112–20168; G06V 2201/03–034; G06V 10/774–7796; G06V 10/25–273; G06V 20/49; G06V 20/695; G06V 40/162; G06V 20/80; G06V 20/698; A61B 8/0891; A61B 8/0883; A61B 6/504; A61B 5/489; A61B 6/507; A61B 6/5217; A61B 5/02007; A61B 5/02014; A61B 5/02021; A61B 5/7485; G01N 2800/323; G01R 33/5635; G16H 50/00; G16H 50/20; G16H 50/50; G16H 50/30; G06K 9/6256; G06K 9/6257; G06K 9/6259; G06K 9/6224; G06N 3/02–126; G06N 20/00–20

See application file for complete search history.

(56) References Cited

U.S. PATENT DOCUMENTS

| | | | |
|---|---|---|---|
| 2015/0356753 A1 | 12/2015 | Lauritsch et al. | |
| 2016/0098531 A1* | 4/2016 | Wu ................... | A61B 5/02035 703/2 |
| 2016/0155234 A1* | 6/2016 | Kang ................. | A61B 6/504 345/419 |
| 2017/0105694 A1 | 4/2017 | Grass et al. | |
| 2017/0245821 A1 | 8/2017 | Itu et al. | |
| 2018/0310888 A1 | 11/2018 | Itu et al. | |
| 2019/0019286 A1 | 1/2019 | Passerini et al. | |
| 2019/0029519 A1* | 1/2019 | Itu ......................... | G16H 40/20 |
| 2019/0150869 A1 | 5/2019 | Passerini et al. | |
| 2019/0318476 A1* | 10/2019 | Isgum ................. | A61B 6/504 |
| 2021/0110543 A1 | 4/2021 | Nickisch et al. | |
| 2021/0118569 A1 | 4/2021 | Grass et al. | |

OTHER PUBLICATIONS

Banerjee et al., A graph theoretic framework for representation, exploration and analysis on computed states of physical systems, Computer Methods in Applied Mechanics and Engineer, 33 pages (2019).

International Application No. PCT/US20/61789, International Preliminary Report on Patentability, dated Jun. 2, 2022.

International Search Report and Written Opinion from International Application No. PCT/US2020/061789 dated Feb. 15, 2021.

Iyer et al., Abstract 12865: Data-Driven Approach for Coronary Vessel Reconstruction, Circulation, 6 pages (2019).

Kass et al., Snakes: Active Contour Models, International Journal of Computer Vision, 321-331 (1988).

Nasr-Esfahani et al., Segmentation of vessels in angiograms using convolutional neural networks, Biomedical Signal Processing and Control, 40:240-251 (2017).

Raissi et al., Hidden Fluid Mechanics: A Navier-Stokes Informed Deep Learning Framework for Assimilating Flow Visualization Data, ARXIV.org, Cornell University Library, 33 pages (2018).

Raissi et al., Physics Informed Deep Learning (Part I): Data-driven Solutions of Nonlinear Partial Differential Equations, ARXIV.org, Cornell University Library, 22 pages (2017).

Sankaran et al., Physics driven reduced order model for real time blood flow simulations, Cornell University Library, 22 pages (2019).

Yang et al., External force back-projective composition and globally deformable optimization for 3-D coronary artery reconstructions, Phys. Med. Biol. 59:975-1003 (2014).

Yang et al., Novel Approach for 3-D Reconstruction of Coronary Arteries From Two Uncalibrated Angiographic Images, IEEE Transactions on Image Processing, 18(7):1563-1572 (2009).

* cited by examiner

ANATOMICAL AND FUNCTIONAL ASSESSMENT OF CAD USING MACHINE LEARNING

CROSS-REFERENCE TO RELATED APPLICATIONS

This application is a Continuation of U.S. application Ser. No. 17/101,550, filed Nov. 23, 2020, which claims priority to provisional U.S. Application Ser. No. 62/939,370, filed on Nov. 22, 2019, entitled, Anatomical and Functional Assessment of CAD Using Machine Learning, the entire disclosure of which is hereby expressly incorporated by reference herein.

FIELD OF THE DISCLOSURE

The invention generally relates to the fully automated detection of coronary vessels and their branches in angiograms and, more particularly, to the calculation of a diameter of such vessels, detection of stenosis and determination of the percent narrowing of stenosis and functional flow limitation from the stenosis.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Coronary Artery Disease (CAD) is among the leading causes of death in the United States, affecting more than 15 million Americans. CAD is characterized by plaque build-up from atherosclerosis in the coronary arteries, which results in the narrowing (also known as stenosis) or blockage of coronary arteries and can lead to symptoms such as angina and possibly myocardial infarction.

Herein, 'state of vessel occlusion' refers to what is commonly understood as CAD, e.g., narrowing (localized or diffused) of the epicardial coronary arteries as seen in imaging studies and characterized by either anatomical or functional indices. Conversely, 'state of microvascular disease' refers to disease in the coronary microcirculation, characterized by the loss of vasodilatory capacity.

The leading invasive diagnostic method for CAD is coronary angiography, in which a contrast agent is injected into a patient's vessels via a catheter and imaged to characterize stenosis severity. This method relies on visualization of anatomic abnormalities and is semi-quantitative, as visual inspection simply approximates the percent area reduction of the lumen. Reductions in diameter that are estimated to be 70% or greater often result in further evaluation or a revascularization procedure, e.g., a coronary stent placement.

A physiologic-based and more quantitative approach to assess coronary stenosis is to compute Fractional Flow Reserve (FFR), a metric defined as the ratio between hyperemic flow in a diseased artery and the expected hyperemic flow in the same artery without stenosis. In the coronary artery, for example, FFR can be expressed as the ratio of a distal coronary pressure to a proximal coronary pressure. For example, a FFR lower than 0.80 indicates the presence of a severe stenosis requiring revascularization due to the compromised flow to the vascular bed distal to the vessel. Revascularization decisions that incorporate FFR have been shown to improve outcomes compared to angiography alone. Determination of FFR is also robust to different patient geometries, accounting for the contributions of collateral vessels to flow and lesion geometry, for example.

Despite its benefits, healthcare professionals often do not measure FFR for a patient, due to the invasive nature of using a catheter-based pressure measurement. Some have found that physicians choose not to perform FFR in nearly two-thirds of all cases, citing the risk to the patient, lack of resources, and additional cost. Another drawback of FFR is its variability due to different hemodynamic conditions, within a patient.

There is a need for more accurate and less-invasive techniques for diagnosis CAD. More specifically, there is a need for a non-invasive, user-independent approach for FFR measurement that would not pose a risk to the patient.

Recently, some have proposed non-invasive computational workflows for determining FFR and assessing CAD severity. These efforts have adopted two distinct approaches. A first approach relies on computed tomography angiography (CTA) data to reconstruct the 3D geometry the coronary tree. The vessel lumen is segmented using edge-detection or machine learning algorithms and the output is manually corrected by an expert. Computational Fluid Dynamics (CFD) simulations are run on the CTA-derived vessel geometry, and FFR is computed on the company's servers or on the cloud. While this non-invasive approach has shown promising results in clinical trials, the use of CTA is severely affected by imaging artifacts due to calcification, which make it difficult to delineate the boundaries of the vessel lumen. CTA is also limited in its ability to detect small serial lesions or to capture fine vessel geometry due to its lower spatial resolution compared to angiography. Lastly, CTA data does not provide information on flow, and thus the boundary conditions (BC) for the CFD analysis of hemodynamics typically rely on morphometric or population data and are thus non-patient-specific.

A second approach, also based on non-invasive computational workflows, relies on multi-plane angiography data to reconstruct the vessel geometry before performing physics-based flow simulations. The main benefit of using angiography is its superior capacity to detect the vessel lumen boundary in the presence of calcified stenoses, and the higher spatial resolution compared to CTA, increasing the sensitivity of the geometry reconstruction algorithm. Furthermore, time-resolved angiography has information on how the contrast agent moves through the vessels and can therefore be used to estimate blood velocity and inform the BC for the CFD analysis. However, angiography-based approaches for FFR quantification have a fundamental challenge, namely the reconstruction of the 3D geometry of the vessels of interest from a set of 2D images which are acquired over time and for different positions of the patient table. Furthermore, all angiography-based approaches for FFR quantification have produced workflows that require substantial inputs by an operator to identify the vessels of interest and to assist with the segmentation. Lastly, all angiography-based approaches have either considered reconstruction of a single coronary artery or used highly simplified methods to model the flow physics. These shortcomings effectively counteract the benefit of using high-resolution angiography data, the most commonly performed procedure for CAD diagnosis.

Regardless of the approach, all computational-derived FFR methods have shown poor predictive performance around the critical diagnostic value of FFR=0.8, due to the aforementioned limitations on image data quality, lack of information on flow, need for operator input, and computational modeling assumptions. Therefore, there is currently no pipeline for accurate FFR computation that could be effectively deployed to any hospital in the nation.

A significant need exists for a more accurate and less-invasive techniques for CAD diagnosis, using a non-invasive approach for FFR measurement that is fully-automated.

SUMMARY OF THE INVENTION

Techniques are provided for anatomical and functional assessment of coronary artery disease (CAD) using machine learning and computational modeling techniques. Techniques herein address the shortcomings of conventional CAD assessment, by using novel methodologies for non-invasive Fractional Flow Reserve (FFR) quantification based on angiographically derived anatomy and hemodynamics data, relying on machine learning algorithms for image segmentation and flow assessment, and relying on accurate physics-based computational fluid dynamics (CFD) simulation for computation of the FFR.

In example embodiments, the present techniques provide processes to assess both anatomical and functional severity of CAD through customized machine learning and computational modeling methods, from the use of both static and dynamic coronary angiography data, with the final goal of determining FFR in a less risky and more accurate manner.

The use of functional markers of disease has gained significant traction in the last few years, displacing simpler anatomy-based markers. In the field of cardiology, fractional flow reserve (FFR) is a hemodynamic index (i.e., a normalized pressure gradient under conditions of maximum flow) that has shown better diagnostic outcomes than anatomy-based makers. In example embodiments herein, two-dimensional (2D) angiography data is used, in particular dynamic angiography data that offers descriptions of the transport of a contrast agent (dye) down the vessels of interest. The 2D time-resolved angiography data is used to inform computational simulations thereby obtaining more accurate predictions of the FFR than those without dynamic transport of contrast agent down the vessels. Further still, in example embodiments, three-dimensional (3D) geometric models are generated from the 2D angiography data, and those 3D geometric models are used for simulation of hemodynamic conditions, including FFR.

In accordance with an example, a computer-implemented method for assessing CAD, the method comprises: receiving, by one or more processors, angiography image data of a vessel inspection region for a subject, wherein the angiography image data comprises angiography images captured over a sampling time period; applying, by the one or more processors, the angiography image data to a vessel segmentation machine learning model and generating, using the vessel segmentation machine learning model, two-dimensional (2D) segmented vessel images for the vessel inspection region; by the one or more processors, generating from the 2D segmented vessel images a three-dimensional (3D) segmented vessel tree geometric model of vessels within the vessel inspection region; and applying, by the one or more processors, the 3D segmented vessel tree model to a fluid dynamics-machine learning model to assimilate, using the fluid dynamics machine learning model, flow data over the sampling time period for one or more vessels within the vessel inspection region; applying, by the one or more processors, the 3D segmented vessel tree model and the assimilated flow data to a 3D, high-fidelity, computational fluid dynamics model; and determining, by the one or more processors, a state of vessel occlusion for the one or more vessels within the vessel inspection region.

In accordance with an example, a computing device configured to assessing CAD comprises: one or more processors and one or more computer-readable memories storing instructions that when executed cause the one or processors to: receive, by one or more processors, angiography image data of a vessel inspection region for a subject, wherein the angiography image data comprises angiography images captured over a sampling time period; apply, by the one or more processors, the angiography image data to a vessel segmentation machine learning model and generating, using the vessel segmentation machine learning model, two-dimensional (2D) segmented vessel images for the vessel inspection region; by the one or more processors, generate from the 2D segmented vessel images a three-dimensional (3D) segmented vessel tree geometric model of vessels within the vessel inspection region; and apply, by the one or more processors, the 3D segmented vessel tree model to a fluid dynamics-machine learning model to assimilate, using the fluid dynamics machine learning model, flow data over the sampling time period for one or more vessels within the vessel inspection region; apply, by the one or more processors, the 3D segmented vessel tree model and the assimilated flow data to a 3D, high-fidelity, computational fluid dynamics model; and determine, by the one or more processors, a state of vessel occlusion for the one or more vessels within the vessel inspection region.

In accordance with an another example, a computer-implemented method for assessing coronary artery disease, the method comprises: receiving, by one or more processors, a plurality of angiography images of a vessel inspection region for a subject, wherein the angiography images are captured over a sampling time period and wherein the vessel inspection region comprises one or more vessels; applying, by the one or more processors, the angiography images to a vessel segmentation machine learning model and generating, using the vessel segmentation machine learning model, two-dimensional (2D) segmented vessel images for the one or more vessels; by the one or more processors, generating, from the 2D segmented vessel images, a one-dimensional (1D) segmented vessel tree geometric model of the one or more vessels; applying, by the one or more processors, the 1D segmented vessel tree model to a fluid dynamics machine learning model to assimilate, using the fluid dynamics machine learning model, flow data over the sampling time period for the one or more vessels; applying, by the one or more processors, the 1D segmented vessel tree model and the assimilated flow data to a graph-theory based reduced order model based on computational fluid dynamics model; and determining, by the one or more processors, a state of vessel occlusion.

In accordance with an example, a computing device configured to assessing CAD comprises: one or more processors and one or more computer-readable memories storing instructions that when executed cause the one or processors to: receive, by one or more processors, a plurality of angiography images of a vessel inspection region for a subject, wherein the angiography images are captured over a sampling time period and wherein the vessel inspection region comprises one or more vessels; apply, by the one or more processors, the angiography images to a vessel segmentation machine learning model and generate, using the vessel segmentation machine learning model, two-dimensional (2D) segmented vessel images for the one or more vessels; by the one or more processors, generate, from the 2D segmented vessel images, a one-dimensional (1D) segmented vessel tree geometric model of the one or more vessels; apply, by the one or more processors, the 1D segmented vessel tree model to a fluid dynamics machine learning model to assimilate, using the fluid dynamics machine learning model, flow data over the sampling time period for the one or more vessels; apply, by the one or more processors, the 1D segmented vessel tree model and the assimilated flow data to a graph-theory based reduced order model based on computational fluid dynamics model; and determine, by the one or more processors, a state of vessel occlusion.

BRIEF DESCRIPTION OF THE DRAWINGS

This patent or application file contains at least one drawing executed in color. Copies of this patent or patent application publication with color drawing(s) will be provided by the United States Patent and Trademark Office upon request and payment of the necessary fee.

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
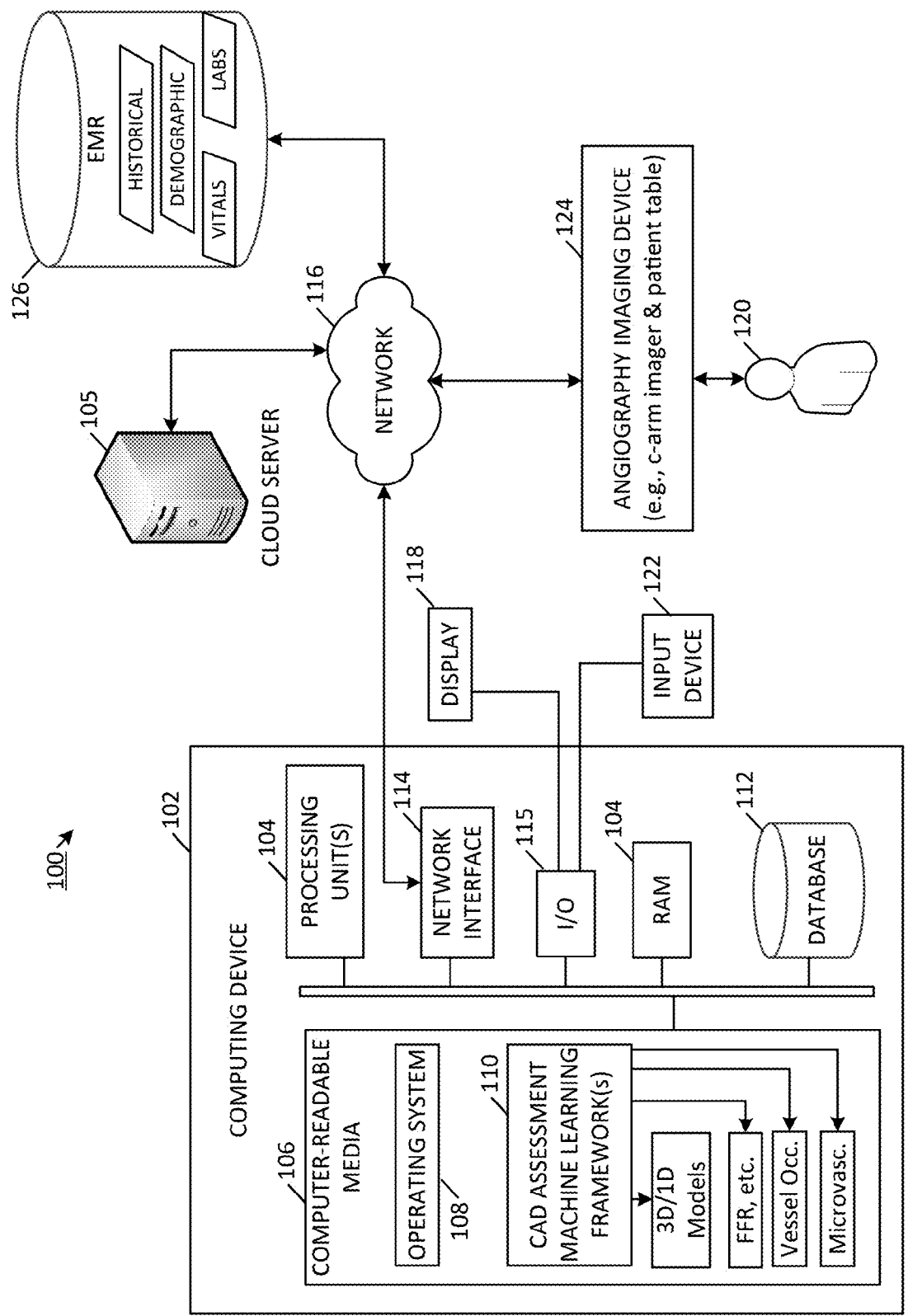
FIG. 1 is a schematic diagram of an example system for performing anatomical and functional assessment of coronary artery disease (CAD), using a machine learning framework for assessing angiography images, in accordance with an example.

Provided are techniques for making anatomical and functional assessments of coronary artery disease (CAD) by analyzing dynamic angiography image data, using physics-based machine learning from neural networks, high-fidelity model order reduction using Graph Theory, together with machine learning-based anatomical segmentation, and high-fidelity computer simulations of hemodynamics, to produce an automated workflow that can offer superior diagnostic performance for CAD. Techniques are provided for performing non-invasive Fractional Flow Reserve (FFR) quantification based on angiographic data, relying on machine learning algorithms for image segmentation, and relying on physics-based machine learning and computational fluid dynamics (CFD) simulation for more accurate functional assessment of the vessel. In particular, in some examples, two-dimensional dynamic angiography data is used to capture the transport of dye down the vessels of interest. This dynamic information can be used to inform the computational simulation and therefore to obtain more accurate predictions of the FFR, particularly in borderline cases. Further, although angiography data does not offer three-dimensional anatomical information, the present techniques include processes for deploying image reconstruction algorithms to obtain 3-dimensional (3D) and one-dimensional (1D) geometric models of a patient's vasculature, which are then used for computer simulation of hemodynamics. While techniques are described herein in terms of determining FFR, the same techniques may be used to calculate other flow reserve metrics. Therefore, references in the examples herein to determinations of FFR include determinations of instantaneous wave-free ratio (iFR), quantitative flow ration (QFR), etc.

In some examples, systems and methods are provided for assessing coronary artery disease. The system may receive angiography image data of a vessel inspection region for a subject. That angiography image data may contain a plurality of angiography images captured over a sampling time period. The system may apply that angiography image data to a first machine learning model, a vessel segmentation machine learning model. The vessel segmentation machine learning model may generate two-dimensional (2D) segmented vessel images for the vessel inspection region, and from these 2D segmented vessel images, a 3D geometric vessel tree model is generated modeling vessels with the vessel inspection region. In other examples, a 1D equivalent vessel tree model may be generated from the 3D vessel tree model. The 3D or 1D geometric vessel tree model may be applied to a second machine learning model, a fluid dynamics machine learning model to assimilate flow data over a sampling time period for one or more vessels within the vessel inspection region. From that assimilated flow data and from the 3D or 1D geometric vessel tree model, a computational fluid dynamics model is configured to determine states of vessels in the vasculature, where those states may include a state of vessel occlusion and/or a state of microvascular disease/resistance. In particular, to determine microvascular disease/resistance, angiographic images may be acquired under two (2) different hemodynamic states, one being a baseline state and a hyperemic (high flow) state, and a comparison may be made between the two. In yet other examples, the microvasculature may be assessed from examining angiographic images captured during the hyperemic state, only.

In FIG. 1, a CAD assessment system 100 includes a computing device 102 (or "signal processor" or "diagnostic device") configured to collect angiography image data from a patient 120 via an angiography imaging device 124 in accordance with executing the functions of the disclosed embodiments. As illustrated, the system 100 may be implemented on the computing device 102 and in particular on one or more processing units 104, which may represent Central Processing Units (CPUs), and/or on one or more Graphical Processing Units (GPUs), including clusters of CPUs and/or GPUs, any of which may be cloud based. Features and functions described for the system 100 may be stored on and implemented from one or more non-transitory computer-readable media 106 of the computing device 102. The computer-readable media 106 may include, for example, an operating system 108 and a CAD machine learning (deep learning) framework 110 having elements corresponding to that of deep learning framework described herein. More generally, the computer-readable media 106 may store trained deep learning models, including vessel segmentation machine learning models, fluid dynamics machine learning models, Graph-theory based reduced order models, executable code, etc. used for implementing the techniques herein. The computer-readable media 106 and the processing units 104 may store image data, segmentation models or rules, fluid dynamic classifiers, and other data herein in one or more databases 112. As discussed in examples herein, the CAD machine learning framework 110 applying the techniques and processes herein (e.g., various different neural networks) may generate 3D and or 1D segmented vessel treed geometric models, FFR and other fluid dynamic assessments, state of vessel occlusion data, and/or microvascular disease data.

The computing device 102 includes a network interface 114 communicatively coupled to the network 116, for communicating to and/or from a portable personal computer, smart phone, electronic document, tablet, and/or desktop personal computer, or other computing devices. The computing device further includes an I/O interface 115 connected to devices, such as digital displays 118, user input devices 122, etc. As described herein, the computing device 102 generates indications of CAD for a subject, which may include states of vessels in the vasculature, such as a state of vessel occlusion (anatomical and functional through an FFR calculation, through an iFR calculation, or through a QFR calculation) and a state of microvascular disease prediction (by contrasting changes in distal resistance when two hemodynamic states are recorded), as an electronic document that can be accessed and/or shared on the network 116.

In the illustrated example, the computing device 102 is communicatively coupled, through the network 116, to an electronic medical records (EMR) database 126. The EMR 126 may be a network accessible database or dedicated processing system. In some examples, the EMR 126 includes data on one or more respective patients. That EMR data may include vital signs data (e.g., pulse oximetry derived hemoglobin oxygen saturation, heart rate, blood pressure, respiratory rate), lab data such as complete blood counts (e.g., mean platelet volume, hematocrit, hemoglobin, mean corpuscular hemoglobin, mean corpuscular hemoglobin concentration, mean corpuscular hemoglobin volume, white blood cell count, platelets, red blood cell count, and red cell distribution width), lab data such as basic metabolic panel (e.g., blood urea nitrogen, potassium, sodium, glucose, chloride, $CO_2$, calcium, creatinine), demographic data (e.g., age, weight, race and gender, zip code), less common lab data (e.g., bilirubin, partial thromboplastin time, international normalized ratio, lactate, magnesium and phosphorous), and any other suitable patient indicators now existing or later developed (e.g., use of $O_2$, Glasgow Coma Score or components thereof, and urine output over past 24 hours, antibiotic administration, blood transfusion, fluid administration, etc.); and calculated values including shock index and mean arterial pressure. The EMR data may additionally or alternatively include chronic medical and/or surgical conditions. The EMR data may include historical data collected from previous examinations of the patient, including historical FFR, iFR, or QFR data. Previous determinations of stenosis, vascular disease prediction, vascular resistance, CFD simulation data, and other data produced in accordance with the techniques herein. The EMR 126 may be updated as new data is collected from the angiography imaging device 124 and assessed using the computing device 102. In some examples, the techniques may provide continuous training of the EMR 126.

In conventional angiography imaging applications, angiography images are captured by the medical imager and then sent to an EMR for storage and further processing, including, in some examples image processing, before those images are sent to a medical professional. With the present techniques, the state of occlusion and state of microvascular disease can be determined at computing device based on the angiography images, and without first offloading those images to the EMR 126 for processing. In total, the techniques proposed herein are able to reduce analysis times for cardiologists considerably, and, in part, due to this bypassing of the EMR 126 for processing. The EMR 126 may be simply poled for data during analysis by the computing device 102 and used for storage of state determinations and other computations generated by the techniques herein. Indeed, there are numerous benefits that result from the faster and more automated analyses resulting from the present techniques. For example, modelling and vessel occlusion/disease state analysis can be performed on vessels corresponding to either left or right coronary trees, separately and sequentially, while still producing results for the cardiologist in mins, for example using the 3D modeler or 1D modeler as described herein.

In the illustrated example, the system 100 is implemented on a single server. However, the functions of the system 100 may be implemented across distributed devices connected to one another through a communication link. In other examples, functionality of the system 100 may be distributed across any number of devices, including the portable personal computer, smart phone, electronic document, tablet, and desktop personal computer devices shown. In other examples, the functions of the system 100 may be cloud based, such as, for example one or more connected cloud CPU (s) or computing systems, labeled 105, customized to perform machine learning processes and computational techniques herein. The network 116 may be a public network such as the Internet, private network such as research institution's or corporation's private network, or any combination thereof. Networks can include, local area network (LAN), wide area network (WAN), cellular, satellite, or other network infrastructure, whether wireless or wired. The network can utilize communications protocols, including packet-based and/or datagram-based protocols such as internet protocol (IP), transmission control protocol (TCP), user datagram protocol (UDP), or other types of protocols. Moreover, the network 116 can include a number of devices that facilitate network communications and/or form a hardware basis for the networks, such as switches, routers, gateways, access points (such as a wireless access point as shown), firewalls, base stations, repeaters, backbone devices, etc.

The computer-readable media 106 may include executable computer-readable code stored thereon for programming a computer (e.g., comprising a processor(s) and GPU(s)) to the techniques herein. Examples of such computer-readable storage media include a hard disk, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. More generally, the processing units of the computing device 102 may represent a CPU-type processing unit, a GPU-type processing unit, a field-programmable gate array (FPGA), another class of digital signal processor (DSP), or other hardware logic components that can be driven by a CPU.

It is noted that while example deep learning frameworks herein are described as configured with example machine learning architectures, any number of suitable convolutional neural network architectures may be used. Broadly speaking, the deep learning frameworks herein may implement any suitable statistical model (e.g., a neural network or other model implemented through a machine learning process) that will be applied to each of the received images. As discussed herein, that statistical model may be implemented in a variety of manners. In some examples, the machine learning model has the form of a neural network, Support Vector Machine (SVM), or other machine learning process and is trained using images or multi-dimensional datasets to develop models for vessel segmentation or fluid dynamics computations. Once these models are adequately trained with a series of training images, the statistical models may be employed in real time to analyze subsequent angiography image data provided as input to the statistical model for determining the presence of CAD and for determining vessel occlusion status and disease. In some examples, when a statistical model is implemented using a neural network, the neural network may be configured in a variety of ways. In some examples, the neural network may be a deep neural network and/or a convolutional neural network. In some examples, the neural network can be a distributed and scalable neural network. The neural network may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. The neural network or other machine learning processes may include many different sizes, numbers of layers and levels of connectedness. Some layers can correspond to stacked convolutional layers (optionally followed by contrast normalization and max-pooling) followed by one or more fully-connected layers. The present techniques may be implemented such that machine learning training may be performed using a small dataset, for example less than 10,000 images, less than 1000 images, or less than 500 images. In an example, approximately 400 images were used. To avoid overfitting, a multi-fold cross validation process can be used (e.g., a 5 fold cross validation). In some examples, to avoid overfitting, a regularization process, such as L1 or L2, can be used. For neural networks trained on large datasets, e.g., greater 10,000 images, the number of layers and layer size can be increased by using dropout to address the potential problem of overfitting. In some instances, a neural network can be designed to forego the use of fully connected upper layers at the top of the network. By forcing the network to go through dimensionality reduction in middle layers, a neural network model can be designed that is quite deep, while dramatically reducing the number of learned parameters.

Figure 2:
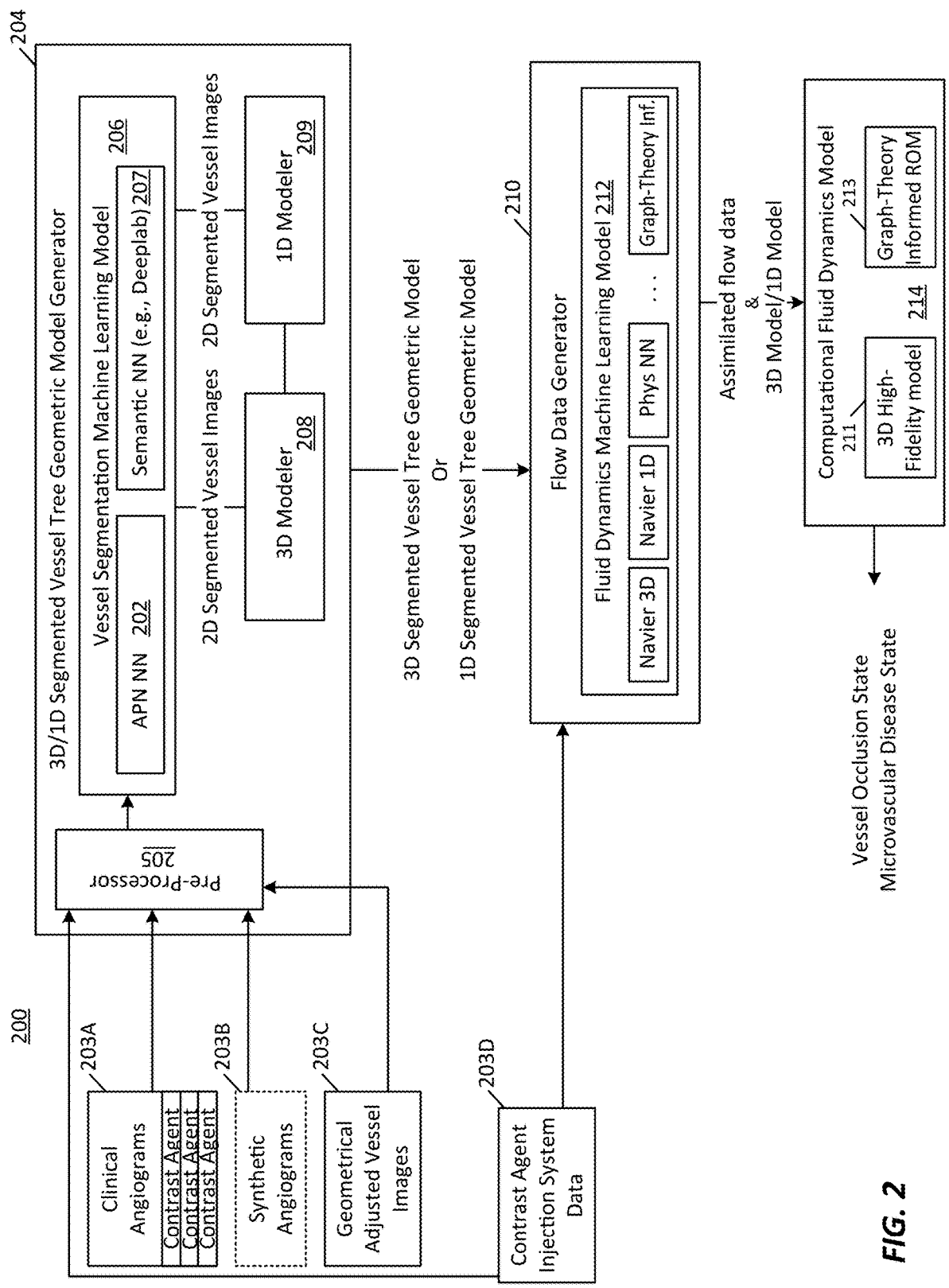
FIG. 2 is a schematic diagram of a CAD assessment machine learning and computational modeling framework as may be implemented in the system of FIG. 1, in accordance with an example.

FIG. 2 illustrates an example deep learning framework 200 that be an example of the CAD machine learning framework 110 of the computer device 102. The framework 200 includes a 3D/1D segmented vessel tree geometric model generator 204 including a pre-processor stage 205, and a vessel segmentation machine learning model 206 that includes two neural networks, an angiographic processing neural network (APN) 202 and a second stage, semantic neural network 207.

In the illustrated example, the pre-processor 205 receives clinical angiogram images 203A, along with data on the contrast agent injection used to form the same. Optionally, the pre-processor 205 may be coupled to receive synthetic angiogram images 203B, for example, for machine learning training. Further, the pre-processor 205 may be coupled to receive geometric adjusted vessel images 203C. In some examples, these inputs may feed directly to the vessel segmentation machine learning model 206, more specifically to the APN 202. The pre-processor 205 is capable of performing various pre-processing on the received image data that may include a de-noising process, a linear filtering process, an image size normalization process, and a pixel intensity normalization process to received image data.

Figure 5:
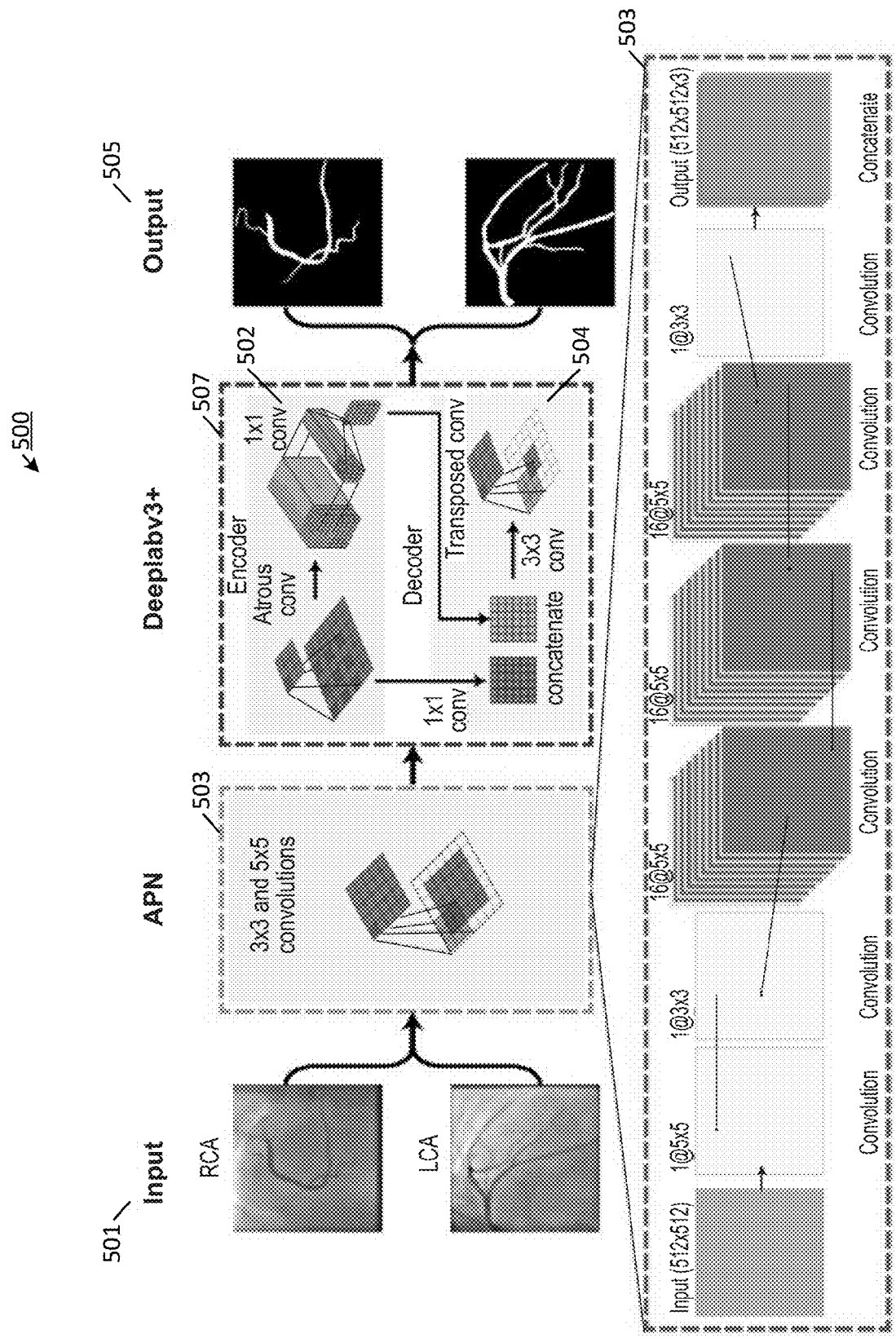
FIG. 5 illustrates an example configuration of the vessel segmentation machine learning model of FIG. 4.

The deep learning framework 200 may operate in two different modes: machine learning training mode and analysis mode. In machine learning training mode of the framework, the angiogram image data 203A, the synthetic angiogram image data 203B, and/or the geometrically adjusted angiogram image data 203C (such as horizontal or vertical flips, arbitrary levels of zoom, rotation, or shearing) may be provided to the APN 202. Different pre-processing functions and values may be applied to the received image data depending on the data type and data source. In analysis mode, in which the machine learning models have been trained, captured angiography image data 203A for a subject is provided to the APN 202 for analysis and CAD determination. In either mode, the pre-processed image data is provided to the 3D/1D segmented vessel tree geometric model generator 204 that includes the vessel segmentation machine learning model 206 that receives the pre-processed image data and performs processes at the APN 202 and the semantic NN 207 and, in an analysis model, generates 2D segmented vessel images. Thus, the vessel segmentation machine learning model 206 may be a convolution neural network, such as two different convolution neural networks in staged configuration, as shown in the example of FIG. 5. Thus, in some examples, the semantic NN 207 is configured as a modified or unmodified Deeplab v3+ architecture.

The 3D/1D segmented vessel tree geometric model generator 204 further includes a 3D modeler 208 configured to generate a 3D vessel tree geometric model of the target region based on the 2D segmented vessel images.

Once the 3D vessel tree model is generated, the generator 204 may applying a further smoothing algorithm and/or surface spline fitting algorithm to further improve the 3D vessel tree model for 3D (e.g. high-fidelity) flow dynamics classification and occlusion analysis.

Figure 6:
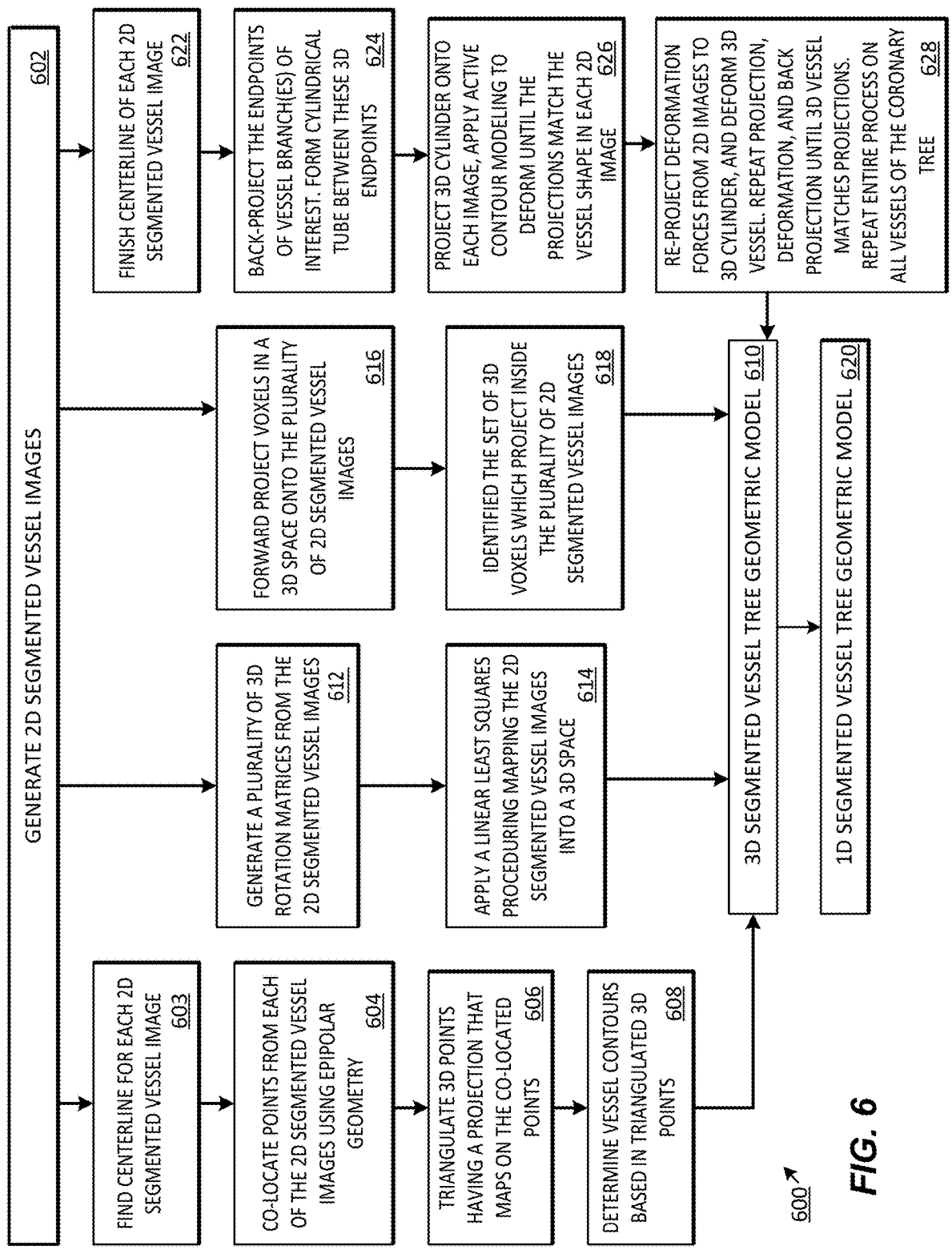
FIG. 6 is a process flow diagram of a series of example methods of generating a three-dimensional (3D) segmented vessel tree model from 2D segmented vessel images generated the process of FIG. 4, in accordance with an example.

To increase processing time and analysis of the state of vessel occlusion in larger vessels and the state of microvascular diseases in smaller vessels, in some examples, the techniques here are implemented with a reduced order model. In some examples, the 3D segmented vessel tree geometric model generated from the captured 2D angiography images, is further reduced to generate a 1D segmented vessel tree geometric model, in which sufficiently data is maintained to nonetheless provide for flow data generation, fluid dynamics modelling, FFR, iFR, or QFR determinations, and computational fluid dynamics modelling. To implement model order reduction, in some examples, the vessel tree geometric model generator 204 includes a 1D modeler 209. The 1D model 209 produces a skeletonization of the 3D segmented vessel tree model, given by pathlines/centerlines in 3D-space of the vessels included in the 3D segmented vessel tree model, and a series of 2D cross-sectional contours separated by arbitrary distances along each pathline/centerline of the tree. An example 1D segmented vessel geometric tree model generated from a 3D segmented vessel geometric tree model is shown in FIG. 6.

The 3D or 1D vessel tree geometric models from generator 208 or 209 are provided to a flow data generator 210, which includes a fluid dynamics machine learning model 212, which may include at least one network of the type: convolutional neural network (CNN), autoencoder, or long short-term memory (LSTM), or a Graph-theory based reduced order model of flow and pressure.

Figure 8:
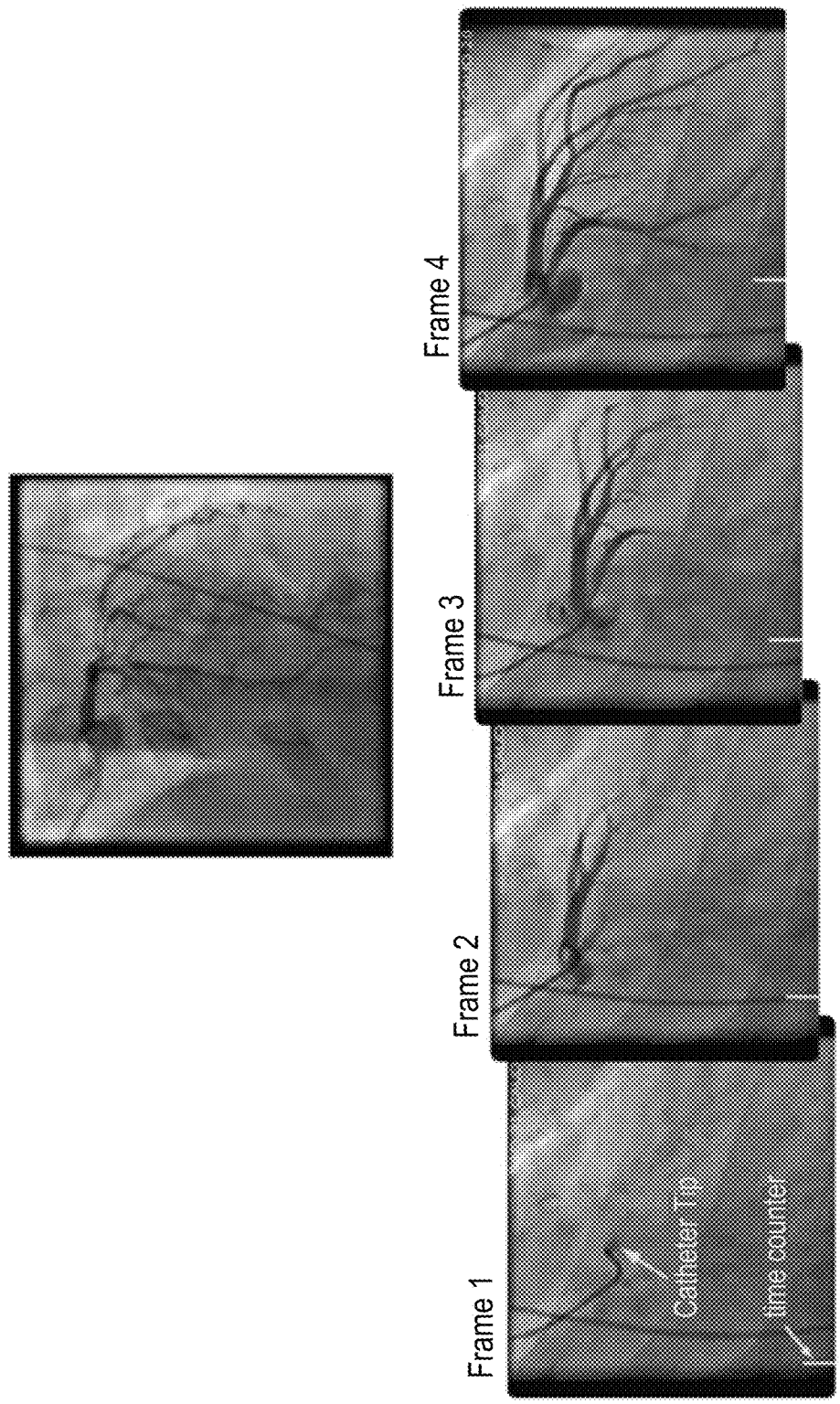
FIG. 8 illustrates images of clinical angiogram images that may be used for training or prediction of a vessel segmentation machine learning model and a fluid dynamics machine learning model, in accordance with an example.

As shown, the fluid dynamics machine learning model 212 may include many different types of models, trained and untrained. In some examples, the fluid dynamics machine learning model 212 is a Navier Stokes informed deep learning framework configured to determine pressure data and velocity data over a 3D vessel space or a 1D vessel space depending on the modeler providing input 208 or 209. In some examples, the Navier Stokes informed deep learning framework includes one or more methods of the type: Kalman Filtering, Physics-informed Neural Network, iterative assimilation algorithm based upon contrast arrival time at anatomical landmarks, and TIMI frame counting. Dynamic data on a series of images describing the transport of the dye down the vessels of interest (see, e.g., FIG. 8) is used to assimilate information on blood velocity. In some cases, the contrast agent injection system 203D with precise information on pressure applied to the bolus of dye, volume of dye, timing, etc., may be used to acquire the clinical angiograms and to provide additional information for the fluid dynamics machine learning model, as shown as well.

In other examples, the fluid dynamics machine learning model 212 includes a graph theory based reduced order model obtained through a graph of discrepancies between ground truth data (in-silico or clinical) including geometry, pressure, flow, and indices such as FFR, iFR, or QFR. Any of the techniques herein to define a graph-theory based reduced order model can generate faster results in comparison to occlusion analysis techniques based on finite element modeling (FEM) or other 3D techniques. Furthermore, the techniques herein can model and analyze not only large vessels but also the microvasculature and thus are able to determine state of occlusion in large vessels and state of microvascular disease in small vessels.

More generally, the model 212 is configured to determine assimilated flow data over the sampling time period for one or more vessels within a 3D vessel tree geometric model or 1D vessel tree geometric model. Such a determination may include determining pressure and/or flow velocity for a plurality of connect vessels in the 3D vessel tree geometric model or 1D vessel geometric tree model.

In some examples, lumped parameter boundary condition parameters are determined by the fluid dynamics machine learning model 212 for one or more vessels in the vessel inspection region. In some examples, the fluid dynamics machine learning model 212 determines a lumped parameter model of flow for a first vessel and determines a lumped parameter model of flow for each vessel branching from the first vessel. Any of these may then be stored as assimilated flow data.

The assimilated flow data from the flow data generator 210 and the 3D vessel tree model (or 1D vessel tree model) are provided to a computational fluid dynamics model 214 that may apply physics-based processes to determine a state of vessel occlusion for the one or more vessels within the 3D vessel tree model (or 1D vessel tree model) and/or a state of microvascular disease for the one or more vessels. In some examples, the computational fluid dynamics model includes one or more of: multi-scale 3D Navier-Stokes simulations with reduced-order (lumped parameter) models; reduced-order Navier-Stokes (1D) simulations with reduced-order models, reduced-order models derived from a Graph Theory framework relying on 1D nonlinear theory models; or reduced order model simulations (lumped parameter models, 0D) models for the entire segmented vessel tree models. In the example shown, the computational fluid dynamics model includes at least a 3D high-fidelity trained model 211 and a graph-theory information reduced order model 213, in accordance with examples herein.

In some examples, the computational fluid dynamics model 214 is configured to determine FFR, iFR, and/or QFR for the one or more vessels in the 3D vessel tree model or 1D vessel tree model from the flow data. In some examples, the computational fluid dynamics model 214 is configured to determine the state of vessel occlusion from the FFR, iFR, and/or QFR for the one or more vessels. In some examples, the computational fluid dynamics model 214 is configured to determine coronary flow reserve (CFR) for the one or more vessels from the flow data, from one or more physiological states (baseline and hyperemic), and to determine the state of microvascular disease from the CFR for the one or more vessels. Determining the state of vessel occlusion includes determining a presence of stenosis in the one or more vessels. Determining the state of microvascular disease includes determining the lumped parameter models on the boundaries of the vessels in vessel inspection region.

Figure 3:
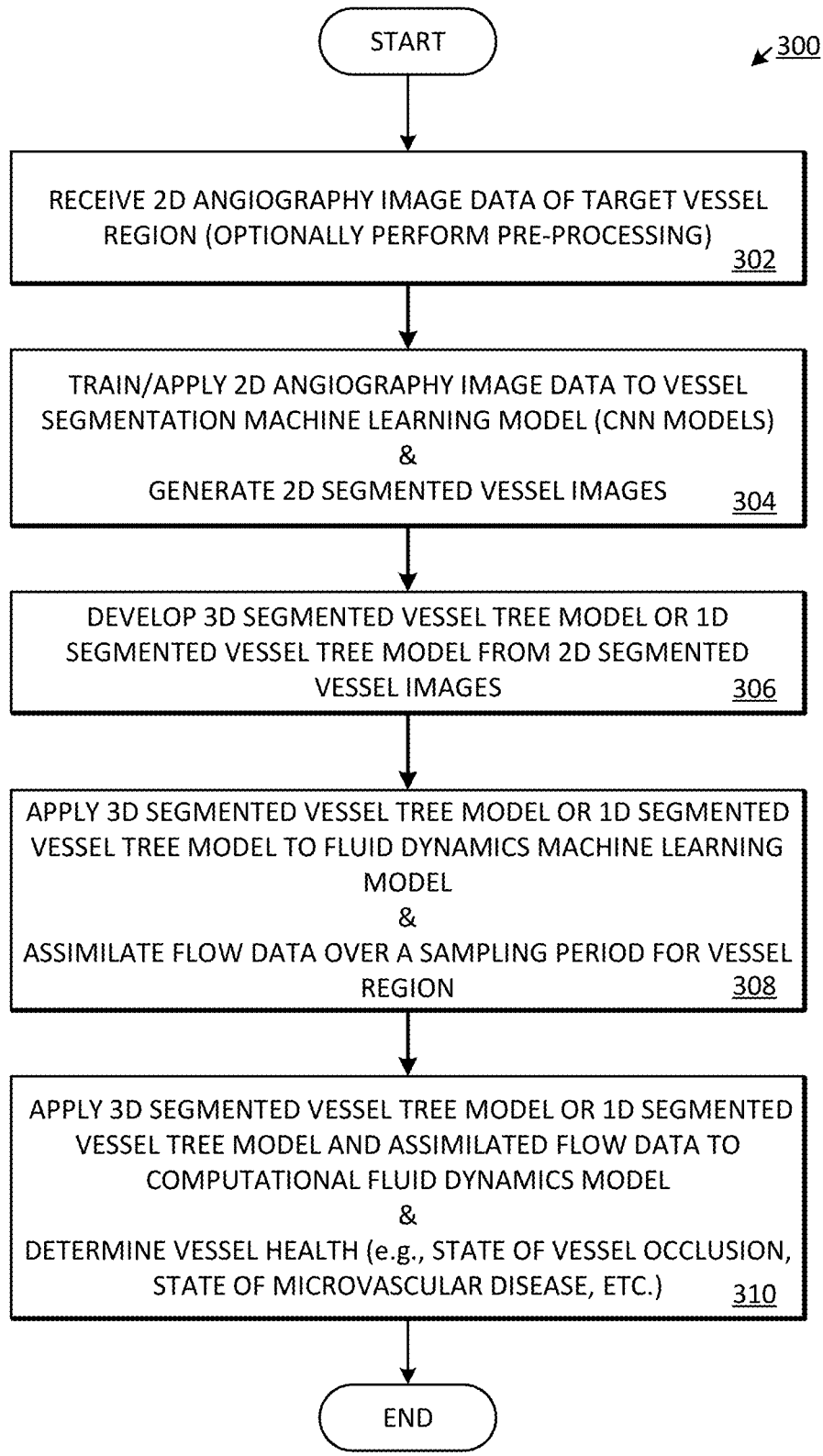
FIG. 3 is a process flow diagram of a method of assessing coronary artery disease, in accordance with an example.

In FIG. 3, a process 300 is shown for assessing coronary artery disease as may be performed by the system 100. 2D angiography image data is obtained by the medical imager 116 and provided to the computer device 102, at a process 302, where optionally pre-processing operations may be performed. In a training mode, the 2D angiography image data may be captured clinical angiogram image data, but such training data may further include synthetic image data, geometrically adjusted image data, etc., as shown in FIG. 2.

Figure 9:
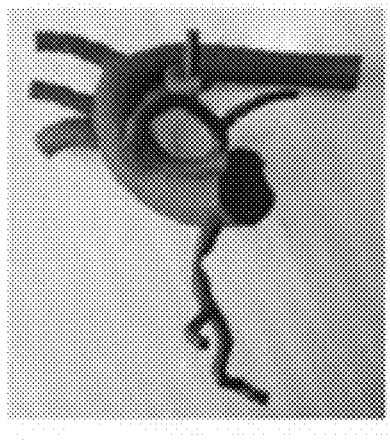
FIG. 9 illustrates images of synthetic angiogram images that may be used for training a vessel segmentation machine learning model and a fluid dynamics machine learning model, in accordance with an example.
Figure 9:
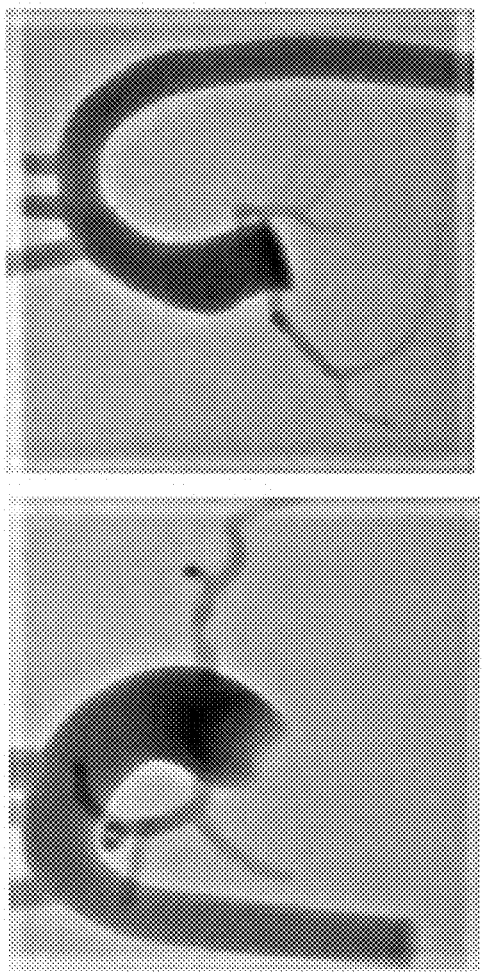

In an example, training of the vessel segmentation machine learning model 206 was performed on 462 clinical angiogram images (see, e.g., FIG. 8) augmented through a combination of geometric transformations (zoom, horizontal flip, vertical flip, rotation, and/or shear) to form over 500,000 angiogram images and 461 synthetic angiogram images (see, e.g., FIG. 9) augmented through those geometric transformations into an additional set of over 500,000 images. The clinical angiogram images may include time series data in a plurality of frames with segmentation for extraction velocity throughout the entire vessel tree, as shown. In some examples, the vessel segmentation machine learning model 206 includes a synthetic images generator configured to generate synthetic images using a combination of transformations such as flipping, shearing, rotation, and/or zooming. In any event, these numbers of images are provided by way of empirical example only, as any suitable number of training images, captured or synthetic, may be used. In a training mode, the image data is applied to the CAD assessment machine learning framework 110 for generating two types of models, the vessel segmentation machine learning model 206 and the fluid dynamics machine learning model 212. In diagnostic mode, the image data is applied to the CAD assessment machine learning framework 110 for classifications and diagnosing CAD.

At a process 304, the CAD assessment machine learning framework 110, for example, through the APN 202 and the semantic NN 207 of the vessel segmentation machine learning model 206, applies the received image data to a vessel segmentation machine learning model and generates 2D segmented vessel images. The CAD assessment machine learning framework 110, such as through the 3D modeler 208, receives the 2D segmented vessel images and generates a 3D segmented vessel tree model or a 1D segmented vessel tree model, at a process 306.

At a process 308, the 3D segmented vessel tree model or a 1D segmented vessel tree model is applied to the fluid dynamics machine learning model 212 of the flow data generator 210, and assimilated flow data is generated over a sampling period for one or more vessels in the 3D vessel tree model or in the 1D segmented vessel tree model.

At a process 310, the assimilated flow data and the 3D vessel tree model or a 1D segmented vessel tree model are applied to the computational fluid dynamics model 214, which assesses the data, using a either the 3D segmented vessel tree model or a 1D vessel tree model, and determines vessel health, such as through a determination of a state of vessel occlusion via indices such as the FFR, iFR, QFR, or others, by solving either the 3D Navier-Stokes equations, or a graph-theory-based reduced order model. If data on two hemodynamic states is available (e.g. baseline and hyperemic conditions), a state of microvascular disease, or CFR, will be determined from the lumped parameter values of the boundary conditions for each hemodynamic state.

Figure 4:
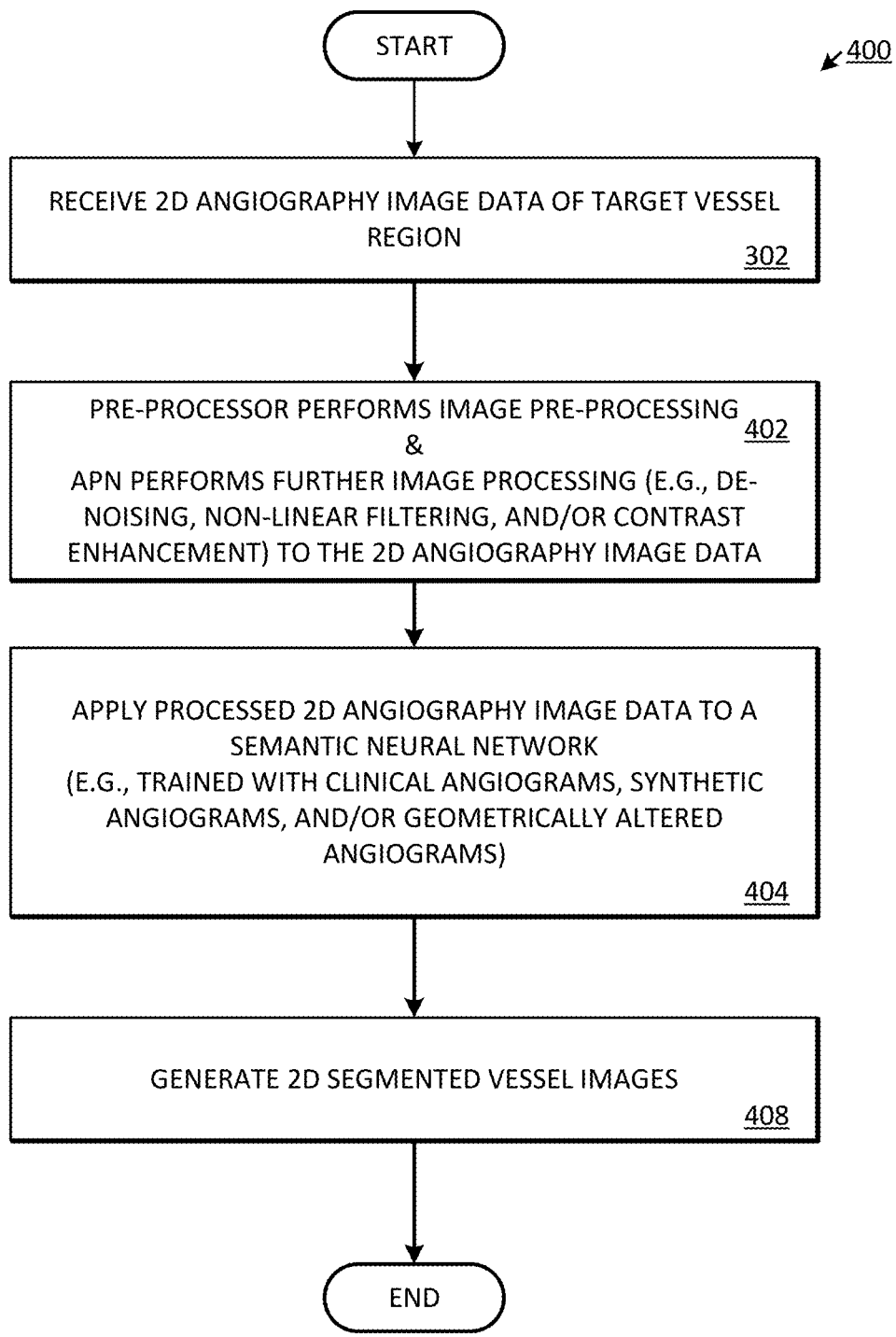
FIG. 4 is a process flow diagram of a method of generating two-dimensional (2D) segmented vessel images from angiography image data, as may be executed by a vessel segmentation machine learning model, as part of the process of FIG. 3, in accordance with an example.

Process 400, shown in FIG. 4, is an example implementation of the process 304 for generating the 2D segmented vessel images from angiography image data that may be performed by the angiographic processing network 202 and the semantic NN 207 of the vessel segmentation machine learning model 206. Initially, the 2D angiography image data for a target vessel region is received, at the process 302. At a process 402, image pre-processing is applied (including an image size normalization process, and/or a pixel intensity normalization process) before further image processing via an angiographic processing network implemented with a convolutional neural network (e.g., APN 202), where the further pre-processing may include a non-linear filtering process, de-noising, and/or contrast enhancement, which, when combined with a process 404 filters out objects such as catheters and bony structures. That is, at the process 404, the pre-processed 2D angiography image is applied to a second convolution neural network (CNN) trained using clinical angiography image data, synthetic image data, and/or geometrically altered image data (e.g., the semantic NN 207). FIG. 5 illustrates an example CNN framework 500 configured with a combination of an angiographic processing network (APN) 503 and a semantic NN in the form of a Deeplab v3+ network 507, configured to generate the 2D segmented vessel images at process 408. The Deeplab v3+ network 507 is a semantic segmentation deep learning technique that includes an encoder 502 and a decoder 504. A series of angiography images 501 are provided as inputs to an angiographic processing network 503, composed of several 3×3 and 5×5 convolutional layers, which applies non-linear filters that perform contrast enhancement, boundary sharpening, and other image processing functions. The APN 503 together with the semantic NN 507 form a vessel segmentation machine learning model, such as the model 206. The APN 503 that feeds the encoder 502, which applies atrous convolutions to the image data, which deploys a rate that controls the effective field of view of each convolution layer. The larger the rate the greater the area of image capture for convolution and low-level feature extraction as may be performed on each input image. For example, rates of 6, 12, and 18 may be used to affect different fields of view to capture different features, for example, features at different resolutions. Using the atrous or dilated convolutions, a dilated sample of an image, or image portion, is convolved to a smaller image. The encoder 502 determines low level features using several atrous convolution strides, then applies a 1×1 (depthwise separable) convolution to combine the outputs of the many different atrous convolutions. This produces a single matrix of features pertaining to different classes, which is input into to the decoder 504, along with high level features determined from 1×1 convolutions applied to the original input image. The convolutions of the encoder 502 may be performed using atrous or depthwise convolutions, in some examples. The decoder 504 concatenates the low level and high-level features into a stacked matrix, then applies transposed convolutions to this matrix, using a fractional stride size to assign class labels to each pixel based on spatial and feature information. These transposed convolutions generate a probability map which determines how likely it is that each pixel belongs to the background or vessel class. The Softmax function is applied to generate the output segmented 2D images 505, as shown.

In FIG. 6, a process 600 that may be performed by the 3D segmented vessel tree model generator 204 to generate the 3D segmented vessel tree model from a generated 2D segmented vessel images 602. As shown, any one of four different pipelines may be used to generate the 3D segmented vessel tree model, from which a 1D segmented vessel tree model can also be obtained, in accordance with an example.

In a first configuration, at a process 603, the 3D modeler 208 receives the 2D segmented vessel images and finds a centerline for each of the 2D segmented vessel images. At a process 604, the 3D modeler 208 co-locates points from each of the 2D segmented vessel images using geometric tools which may include epipolar geometry, projective geometry, Euclidean geometry or any related geometric tools, and, at a process 606, triangulates 3D points having a projection that maps on the co-located points (back-projection). The local radius of the vessel is determined from each 2D segmented vessel, and these radius vectors are projected onto the 3D centerline. From there, at process 608, the 3D modeler 208 determines vessel contours based on the triangulated 3D points and the 3D vessel tree model is generated, at a process 610. From there, a 1D vessel tree model is generated a process 620.

In second configuration, the 3D modeler 208 generates a plurality of 3D rotation matrices from the 2D segmented vessel images, at a process 612. The 3D modeler 208 then generates the 3D segmented vessel tree model by solving a linear least squares system of equations mapping the plurality of the 2D segmented vessel images into a 3D space, at a process 614.

In third configuration, the 3D modeler 208 forward projects voxels in a 3D space onto the plurality of 2D segmented vessel images, at a process 616, and identifies the set of 3D voxels which project inside the plurality of 2D segmented vessel images, at a process 618. The resulting binary volume is then smoothed to ensure a realistic vessel boundary.

In a fourth configurations, active contours models are used to reconstruct the 3D geometry of the vessel. The finish centerline of each 2D segmented vessel image is performed, at a process 622. The endpoints of each vessel are identified in the plurality of 2D segmented vessel images and back-projected, at a process 624, to identify the endpoints in 3D space. A 3D cylinder is drawn between these 3D endpoints, and external and internal forces on this cylinder are defined by material properties, imaging parameters of the system, and re-projection error between the cylinder and the plurality of 2D segmented images, as contour modeling to deform until the projections match the vessel shape in each 2D image, at a process 626. At a process 628, a re-project deformation is performed forcing the 2D images to the 3D cylinder where a deformation may be performed. The forces deform the cylinder in order to minimize the re-projection error. The process 628 may be repeated for all branches of the vessel until the full coronary tree is reconstructed.

The fluid dynamics machine learning models 212 herein are, in some examples, implemented as physics informed neural networks, in particular neural networks capable of encoding any underlying physical laws that govern a given dataset, and that can be described by partial differential equations. For example, the fluid dynamics machine learning model may include partial differential equations for the 3D Navier-Stokes equations, a set of 4 partial differential equations for balance of mass and momentum, whose unknown fields are a 3D velocity vector (vx, vy, vz) and a scalar p.

In an example, a solution to the flow within the 3D vessel tree model is generated using in the incompressible 3D Navier-Stokes equations of flow, according to Equations 1 and 2:

$$\rho \bar{u}_{,t} + \rho \bar{u} \cdot \nabla \bar{u} = -\nabla p + \text{div}(\underline{\tau}) + \bar{f}$$

$$\text{div}(\bar{u}) = 0 \qquad (1) \& (2)$$

where u is the fluid velocity, p is the pressure, f is a body force (here, assumed to be zero and $\underline{\tau} = 2\mu D$ with $D = \frac{1}{2}(\nabla \bar{u} + \nabla \bar{u}^T)$ is the viscous stress tensor for a Newtonian fluid.

Figure 7:
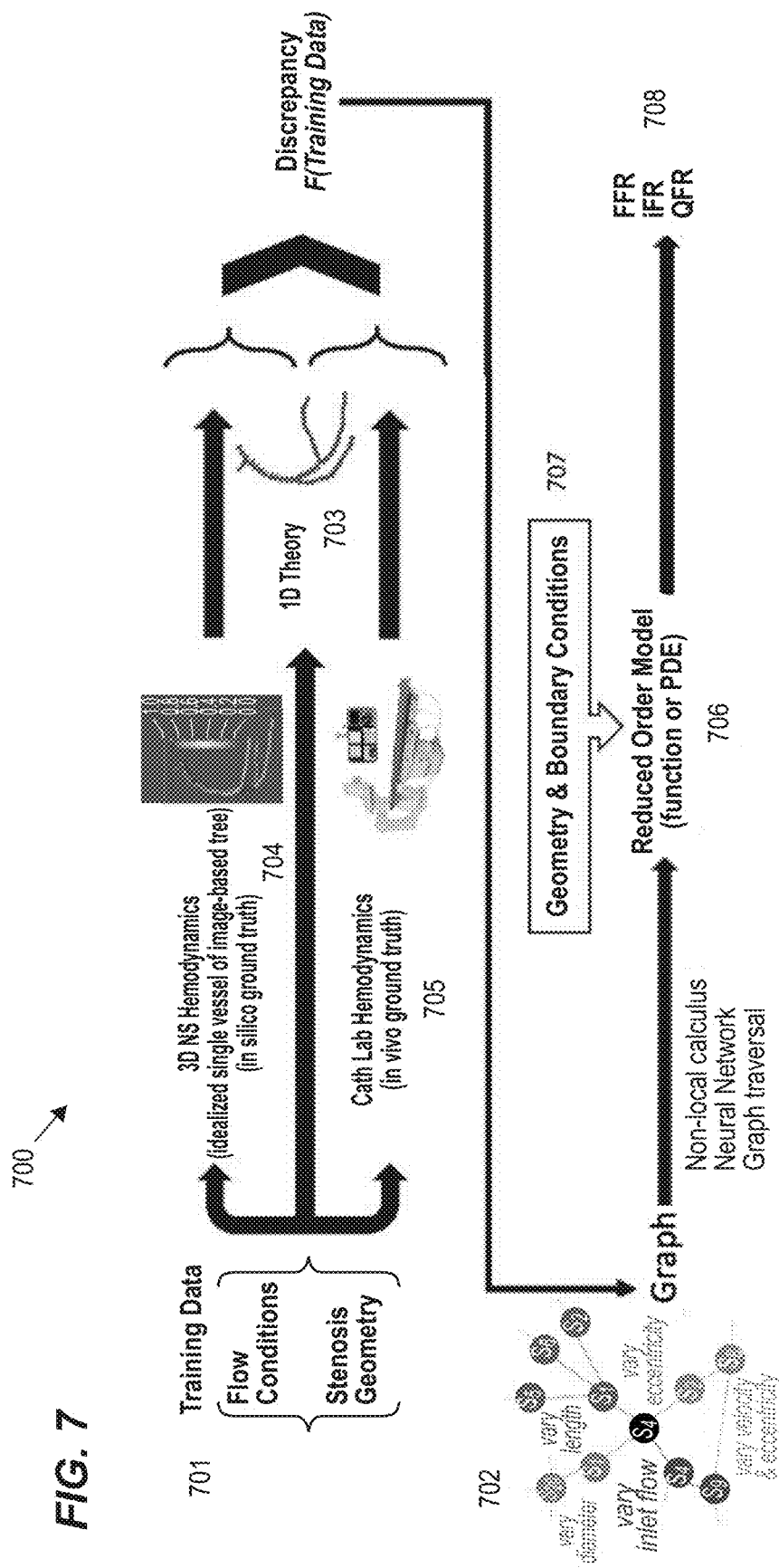
FIG. 7 illustrates a process to define a graph-theory based reduced order model capable of accurately and efficiently characterizing the functional state of CAD, in accordance with an example.

Alternatively, in some examples, the fluid dynamics machine learning model 212 may include a graph-theory based reduced order model, as illustrated in FIG. 7. The graph-theory based reduced order model may be run in machine learning mode or in analysis mode. In machine learning mode, training data 701 on flow, stenosis geometry, measured values of FFR, iFR, QFR, etc. are used to define a dense graph of discrepancies 702 between ground truth data and a low-fidelity model of flow, given by a 1D non-linear theory model 703. The ground truth data can be given by either in silico simulations of 3D Navier-Stokes equations 704 or by in vivo data acquired in the catheterization laboratory 705. A dense graph of discrepancies 702 may be generated by analyzing a large number of permutations of stenosis diameter, length, eccentricity, flow through the stenosis, or a combination thereof. Once a dense graph of discrepancies is generated, a reduced order model 706 may be derived through nonlocal calculus, deep neural networks, or direct traversal over the vertices of the graph. The reduced order model may be an algebraic equation, or an ordinary or partially differential equation. In analysis mode, the inputs 707 to the reduced order model are a geometry given by a 1D segmented vessel tree extracted by process 610, and boundary conditions on flow and pressure extracted through data assimilation process 308. The reduced order model 706 and inputs 707 produce the desired state of vessel occlusion 708 (anatomical and functional through an FFR calculation, through an iFR calculation, or through a QFR calculation) and a state of microvascular disease. The 1D non-linear theory model 703 is a 1D non-linear Navier-Stokes model, which includes two partial differential equations for mass balance and momentum balance, with unknowns being the flow Q and the cross-sectional average pressure, P.

In an example, the solution to the flow obtained with the 1D non-linear theory model is generated using conversation of mass and momentum of an incompressible Newtonian fluid according to the following system of equations, Equations 3 and 4.

$$\begin{cases} \dfrac{\partial A}{\partial t} + \dfrac{\partial (AU)}{\partial x} = 0 \\ \dfrac{\partial U}{\partial t} + U \dfrac{\partial U}{\partial x} + \dfrac{1}{\rho_f} \dfrac{\partial P}{\partial x} = \dfrac{f}{\rho_f A} \end{cases} \qquad (3) \text{ and } (4)$$

where x is the axial coordinate along the vessel, t is the time, A(x,t) is the cross-sectional area of the lumen, U(x,t) is the axial blood flow velocity averaged over the cross-section, P(x,t) is the blood pressure averaged over the cross-section, pf is the density of blood assumed to be constant, and f(x,t) is the frictional force per unit length. The momentum correction factor in the convection acceleration term of Equation 1 can be assumed to be equal to one. Equations 3 and 4 can also be derived by integrating the incompressible Navier-Stokes equations over a generic cross section of a cylindrical domain.

In any event, the fluid dynamics machine learning models herein may be formed with data-driven algorithms for inferring solutions to these general nonlinear partial differential equations, through physics-informed surrogate classification models. For principled physical laws that govern the time-dependent dynamics of a system, or some empirical validated rules or other domain expertise, information about the physical laws may be used as a regularization agent that constrains the space of admissible solutions to a manageable size. In return, encoding such structured information into a machine learning model results in amplifying the information content of the data that the algorithm sees, enabling it to quickly steer itself towards the right solution and generalize well even when only a few training examples are available. Furthermore, the reduced order models proposed herein will be trained using graph theory and discrepancies between a low fidelity 1D nonlinear model of blood flow and ground truth data given by either 3D high-resolution Navier Stokes models or in-vivo anatomical and hemodynamic data, to accurately and efficiently capture hemodynamics around stenosis. In various examples, of the reduced order model is defined from the graph of discrepancies via one of the following three methods: a) CNN, b) non-local calculus, c) exploration of graphs using transversal algorithms (see, e.g., Banerjee et al., A graph theoretic framework for representation, exploration and analysis on computed states of physical systems, Computer Methods in Applied Mechanics and Engineer, 2019, which is hereby incorporated by reference).

In an example, the fluid dynamics machine learning model is configured to include hidden fluid mechanics (HFM), a physics informed deep learning framework capable of encoding an class of physical laws governing fluid motions, namely the Navier-Stokes equations, as described in Raissi et al., *Hidden Fluid Mechanics, A Navier-Stokes Informed Deep Learning Framework for Assimilating Flow Visualization Data*, dated on cover 13 Aug. 2018, herein incorporated by reference. In an example, the fluid dynamics machine learning model applies the underlying conservation laws (i.e., for mass, momentum, and energy) to infer hidden quantities of interest such as velocity and pressure fields merely from the 3D vessel tree model generated at different times from angiography image data taken at different times. The fluid dynamics machine learning model may apply an algorithm that is agnostic to the geometry or the initial and boundary conditions. That makes the HFM configuration highly flexible in choosing the types of vessel image data that can be sued for training and for diagnoses by the model. The fluid dynamics machine learning model is trained to predict pressure and velocity values in both two- and three-dimensional flows of imaged vessels. Such information can be used to determine other physics related properties such as pressure or wall shear stresses in arteries.

Figure 10A:
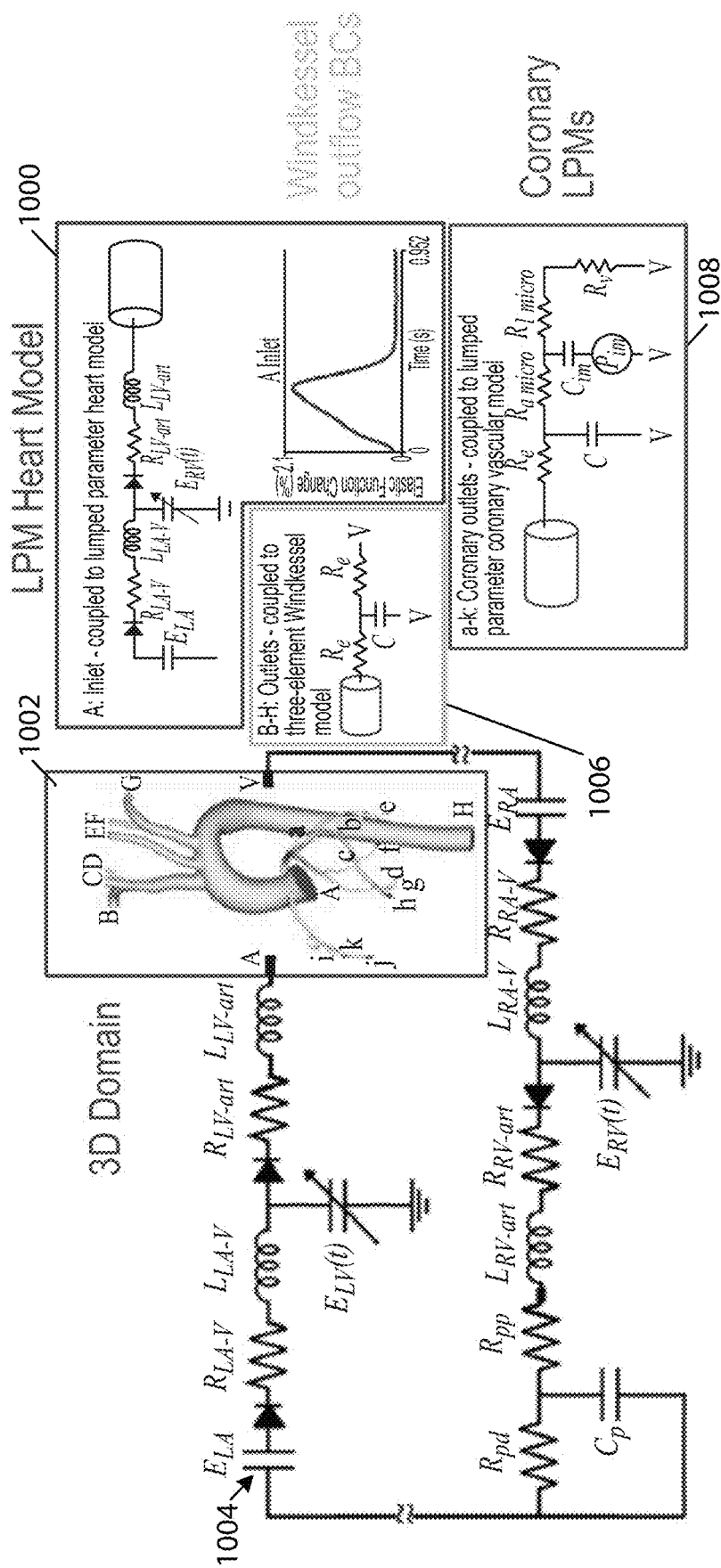
FIGS. 10A and 10B illustrate an example 3D vessel tree model and various lumped parameter models that may be used by a computational fluid dynamics system model for each of those parameters.
Figure 10B:
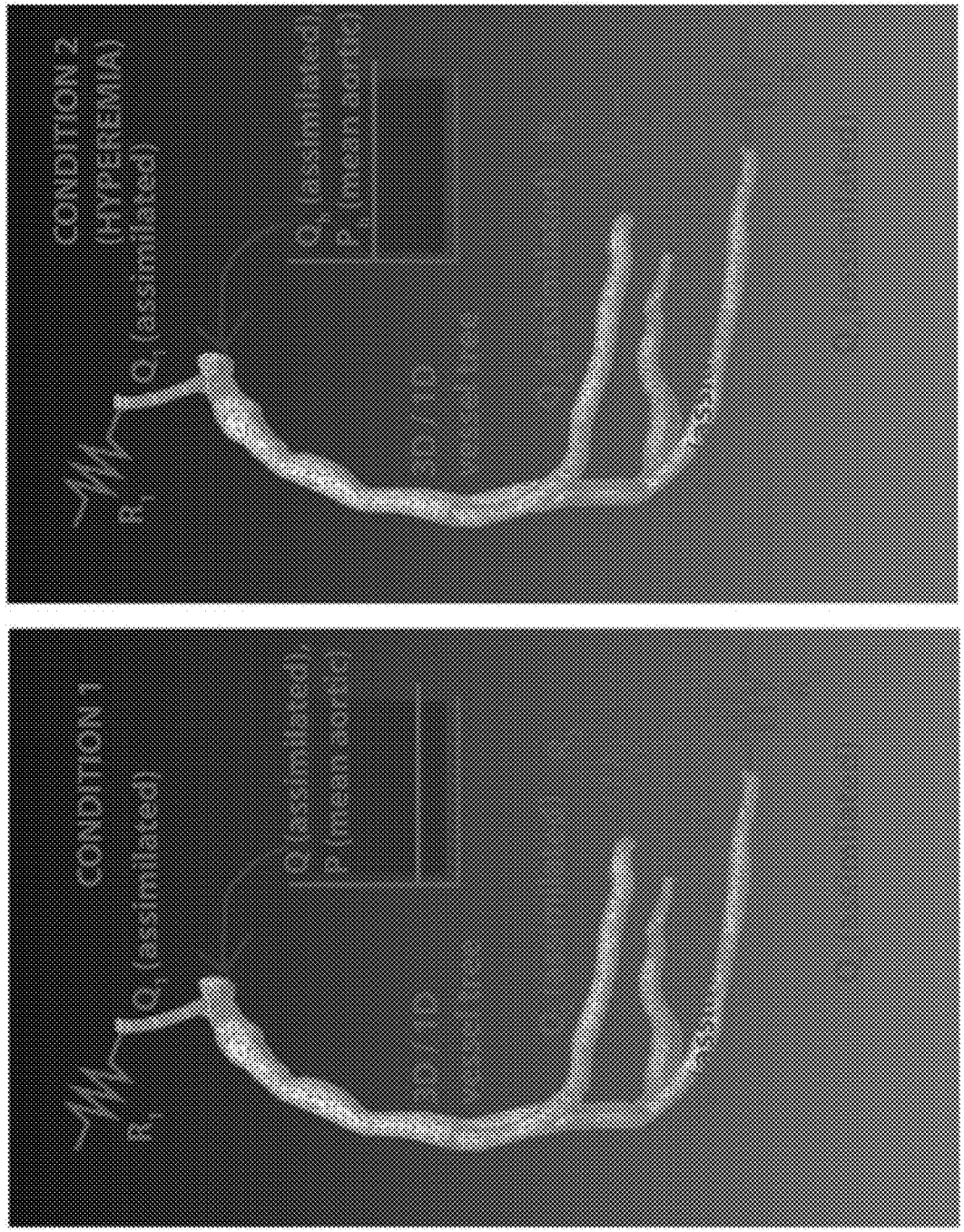

In some examples, the computational fluid dynamics model is configured to determine a lumped parameter model attached to each vessel of the 3D vessel tree model or the 1D vessel tree model. The computational fluid dynamics model may include a series of lumped parameter model (LPM) for different vessels as shown in FIG. 10A. An example LPM 1000 is provided for a heart model coupled to the inflow face of 3D vessel tree 1002. The vessel tree 1002 is formed of multiple different vessels labeled with different letters, A inlet, B-H aortic outlets, and a-k coronary artery outlets. LPM 1006 is used for each of the outlets B-H, representing the microcirculation of vessels other than the coronary arteries. An LPM 1008 is provided for the coronary outlets a-k and is coupled to the LPM 1000 representing the heart. Parameters for this model are estimated from the patient's data on flow and pressure (either measured in the catheterization laboratory or estimated using data assimilation techniques described in 308 or using morphometric considerations such as Murray's Law). A LPM 1004, including both left and right sides of the heart, may be used to run analyses in closed-loop configuration. A model of this nature may be used to calculate hemodynamics under pulsatile conditions. A second example LPM is shown in FIG. 10B. Here, inflow boundary conditions may be defined by either the patient's mean arterial pressure of by a mean flow measured or estimated from the dynamic angiographic data. Patient-specific outflow boundary conditions may be defined by flow down each vessel estimated via the fluid dynamics machine learning process 308 that assimilates flow data over a sampling period, or by LPM (resistors) coupled to each of the outlet faces of the coronary tree. The LPM for each branch of the vessel tree (whether 3D or 1D) may be also estimated once the computed solutions for pressure and flow within the vessel tree are known, assuming a pressure gradient across the LPM down to an fixed level of capillary pressure. A model of this nature may be used to simulate hemodynamics under steady-steady conditions. This process can be repeated for each available hemodynamic state (e.g. baseline and hyperemia). LPMs are used to represent cardiovascular regions where the full detail of the flow solution is not required, but it is important for the model to include the relationship between pressures, flows—and in some cases, volumes—in these regions. They are ideal in regions when detailed spatial information on the vascular geometry is neither available nor of fundamental importance. Their parameters exert a fundamental influence on the pressure and velocity fields in the vessel tree model, and so the parameters must be tuned to achieve physiological values which agree with the data assimilated from the patient images, any additional clinical recordings which are available for the individual in question. When insufficient data is available for parameterization for the specific patient, data from the scientific literature on expected values can be used to assist in determining appropriate parameters.

Figure 11:
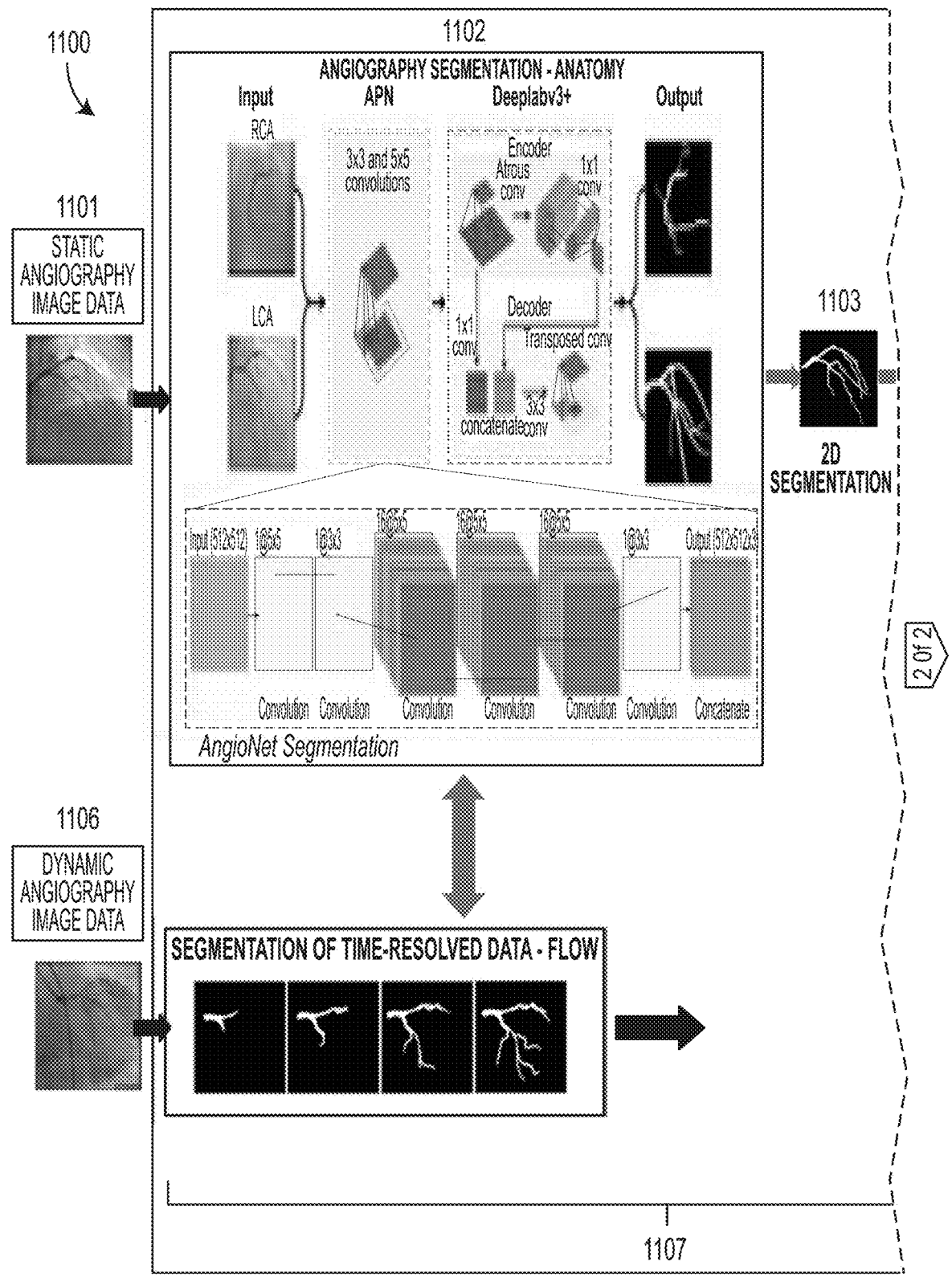
FIG. 11 illustrates an example process of generating anatomical and functional assessment of CAD, in accordance with an example.
Figure 11:
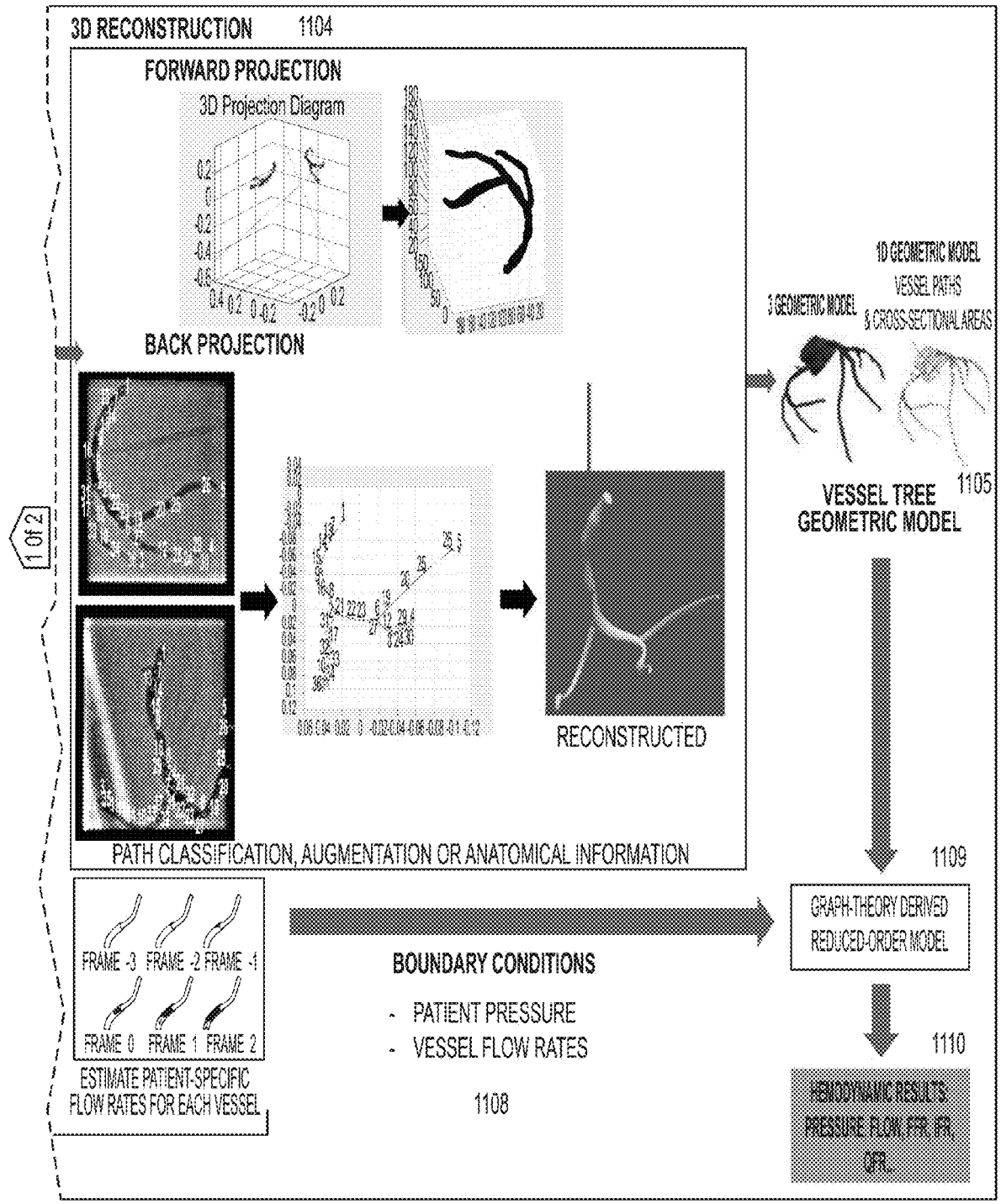

In an example, the anatomical and functional assessment of CAD follows the workflow 1100 depicted in FIG. 11. Several angiographic images 1101 taken under different orientations are fed to a machine learning segmentation module 1102 (corresponding to processes 302, 304, and 402 and 404), which automatically produces 2D segmented images of the angiographic images 1103. These images are then fed to an algorithm 1104 that generates 3D and 1D segmented vessel tress 1105, following a combination of processes given in FIG. 6. This workflow is used to automatically characterize the lumen diameters and therefore anatomical severity of CAD. Further, a series of angiographic images 1106 defining the transport of the dye down the regions of interest in the vessel tree, are feed to a series of fluid dynamics machine learning algorithms 1107 that assimilate information on blood velocity and/or pressure for each vessel of interest in the vessel tree. This system produces boundary conditions on velocity and pressure 1108, which, together with the vessel tree 1105 are fed as inputs for the Graph-theory derived reduced order model 1109, which ultimately produces the desired functional metrics of CAD 1110, including FFR, iFR, QFR and microvascular resistance.

Additional Aspects

Aspect 1. A computer-implemented method for assessing coronary artery disease, the method comprising:
(a) receiving, by one or more processors, angiography image data of a vessel inspection region for a subject, wherein the angiography image data comprises angiography images captured over a sampling time period;
(b) applying, by the one or more processors, the angiography image data to a vessel segmentation machine learning model and generating, using the vessel segmentation machine learning model, two-dimensional (2D) segmented vessel images for the vessel inspection region;
(c) by the one or more processors, generating from the 2D segmented vessel images a three-dimensional (3D) segmented vessel tree geometric model of vessels within the vessel inspection region;
(d) applying, by the one or more processors, the 3D segmented vessel tree geometric model to a fluid dynamics machine learning model to assimilate, using the fluid dynamics machine learning model, flow data over the sampling time period for one or more vessels within the vessel inspection region;
(e) applying, by the one or more processors, the 3D segmented vessel tree geometric model and the assimilated flow data to a 3D high-fidelity computational fluid dynamics model; and
(f) determining, by the one or more processors, a state of vessel occlusion for the one or more vessels within the vessel inspection region.

Aspect 2. The computer-implemented method of aspect 1, further comprising: determining, by the one or more processors, a state of microvascular disease for the one or more vessels within the vessel inspection region by performing (a)-(e) at at least two different hemodynamic states.

Aspect 3. The computer-implemented method of aspect 1, wherein the vessel segmentation machine learning model is a convolutional neural network.

Aspect 4. The computer-implemented method of aspect 1, further comprising:
applying, by the one or more processors, to the received angiography image data at least one of a de-noising process, a linear filtering process, an image size normalization process, and a pixel intensity normalization process to produce filtered angiography image data.

Aspect 5. The computer-implemented method of aspect 4, further comprising:
feeding the filtered angiography image data to an angiography processing network (APN), trained to remove from address the main challenges the angiography image data low contrast images, catheters, and/or overlapping bonny structures.

Aspect 6. The computer-implemented method of aspect 5, further comprising:
feeding an output of the APN to a semantic image segmentation to produce automatic binary 2D segmented vessel images.

Aspect 7. The computer-implemented method of aspect 1, wherein generating the 3D segmented vessel tree geometric model comprises:
finding a centerline for each of the 2D segmented vessel images;
co-locating points from each of the 2D segmented vessel images using an epipolar geometry;
triangulating 3D points having a projection that maps on the co-located points; and
determining vessel contours based on the triangulated 3D points.

Aspect 8. The computer-implemented method of aspect 1, wherein generating the 3D segmented vessel tree geometric model comprises:
generating a plurality of 3D rotation matrices from a plurality of the 2D segmented vessel images;
generating the 3D segmented vessel tree geometric model by solving a linear least squares system of equations mapping the plurality of the 2D segmented vessel images into a 3D space.

Aspect 9. The computer-implemented method of aspect 1, wherein generating the 3D segmented vessel tree geometric model comprises:
forward projecting voxels in a 3D space onto the plurality of 2D segmented vessel images; and
identifying the set of 3D voxels which project inside the plurality of 2D segmented vessel images.

Aspect 10. The computer-implemented method of aspect 1, wherein generating the 3D segmented vessel tree geometric model comprises:
using active contours to deform via internal and external forces, cylindrical geometries onto the plurality of segmented 2D images.

Aspect 11. The computer-implemented method of aspects 1, further comprising:
applying, by one or more processors, to the 3D segmented vessel tree geometric model at least one of a smoothing algorithm, and surface spline fitting algorithm Aspect 12. The computer-implemented method of aspect 1, generating the 3D segmented vessel tree geometric model by performing a back-projection the 2D segmented vessel images.

Aspect 13. The computer-implemented method of aspect 1, wherein the fluid dynamics machine learning model comprises at least one network of the type: convolutional neural network (CNN), autoencoder, or long short-term memory (LSTM).

Aspect 14. The computer-implemented method of aspect 1, wherein fluid dynamics machine learning model is a Navier Stokes informed deep learning framework configured to determine pressure data and velocity data over a 3D vessel space.

Aspect 15. The computer-implemented method of aspect 14, wherein the Navier Stokes informed deep learning framework comprises one or more methods of the type: Kalman Filtering, Physics-informed Neural Network, iterative assimilation algorithm based upon contrast arrival time at anatomical landmarks, and TIMI frame counting.

Aspect 16. The computer-implemented method of aspect 1, wherein determining the flow data over the sampling time period comprises determining pressure and flow velocity data for the one or more vessels over the sampling time period.

Aspect 17. The computer-implemented method of aspect 1, wherein determining the flow data over the sampling time period comprises determining pressure and flow velocity data for a plurality of connected vessels in the vessel inspection region.

Aspect 18. The computer-implemented method of aspect 1, wherein the computational fluid dynamics model comprises of one or more of:
multi-scale 3D Navier-Stokes simulations with reduced-order (lumped parameter) models; reduced-order Navier-Stokes (1D) simulations with reduced-order models; or reduced order model simulations (lumped parameter models, 0D) models for the segmented vessel tree geometric models.

Aspect 19. The computer-implemented method of aspect 1, wherein the lumped parameter boundary condition parameters are determined by the fluid dynamics machine learning model for one or more vessels in the vessel inspection region.

Aspect 20. The computer-implemented method of aspect 19, further comprising determining a lumped parameter model of flow for a first vessel and determining a lumped parameter model of flow for each vessel branching from the first vessel.

Aspect 21. The computer-implemented method of any of aspects 1 further comprising:
determining fractional flow reserve (FFR), instantaneous wave-free ratio (iFR), or quantitative flow ratio (QFR) for the one or more vessels from the flow data; and
determining the state of vessel occlusion from the FFR, iFR or QFR for the one or more vessels.

Aspect 22. The computer-implemented method of aspects 1 further comprising:
determining coronary flow reserve (CFR) for the one or more vessels from the flow data, from one or more physiological states; and
determining the state of microvascular disease from the CFR for the one or more vessels.

Aspect 23. The computer-implemented method of aspect 22, wherein the one or more physiological states includes a baseline physiological state and a hyperemic physiological state.

Aspect 24. The computer-implemented method of aspect 1, wherein determining the state of vessel occlusion comprises determining a presence of stenosis in the one or more vessels.

Aspect 25. The computer-implemented method of aspect 1, wherein determining the state of microvascular disease comprises determining the lumped parameter models on the boundaries of the vessels in vessel inspection region at a plurality of hemodynamic states.

Aspect 26. The computer-implemented method of aspect 1, further comprising: feeding a plurality of synthetic angiography images, a plurality of clinical angiography images, and a plurality of augmented angiography images to train the vessel segmentation machine learning model.

Aspect 27. The computer-implemented method of aspect 1, wherein the angiography image data comprises the angiography images captured over the sampling time period includes angiography images captured during a baseline state and angiography images captured during a pharmacologically-induced hyperemia state.

Aspect 28. A computer-implemented method for assessing coronary artery disease, the method comprising:
  (a) receiving, by one or more processors, a plurality of angiography images of a vessel inspection region for a subject, wherein the angiography images are captured over a sampling time period and wherein the vessel inspection region comprises one or more vessels;
  (b) applying, by the one or more processors, the angiography images to a vessel segmentation machine learning model and generating, using the vessel segmentation machine learning model, two-dimensional (2D) segmented vessel images for the one or more vessels;
  (c) by the one or more processors, generating, from the 2D segmented vessel images, a one-dimensional (1D) segmented vessel tree geometric model of the one or more vessels;
  (d) applying, by the one or more processors, the 1D segmented vessel tree geometric model to a fluid dynamics machine learning model to assimilate, using the fluid dynamics machine learning model, flow data over the sampling time period for the one or more vessels;
  (e) applying, by the one or more processors, the 1D segmented vessel tree geometric model and the assimilated flow data to a graph-theory based reduced order model based on computational fluid dynamics model; and
  (f) determining, by the one or more processors, a state of vessel occlusion.

Aspect 29. The computer-implemented method of aspect 28, further comprising: determining, by the one or more processors, a state of microvascular disease for the one or more vessels within the vessel inspection region by performing (a)-(e) at at least two different hemodynamic states.

Aspect 30. The computer-implemented method of aspect 28, wherein the angiography images captured over the sampling time period comprise angiography images captured during a baseline state and angiography images captured during a hyperemic state.

Aspect 31. The computer-implemented method of aspect 30, wherein generating from the 2D segmented vessel images the 1D segmented vessel tree geometric model of vessels within the vessel inspection region comprises producing a skeletonization of the 3D segmented vessel tree geometric model, given by pathlines/centerlines in 3D-space of vessels included in the 3D segmented vessel tree geometric model, and a series of 2D cross-sectional contours separated by arbitrary distances along each pathline/centerline of the tree.

Aspect 32. The computer-implemented method of aspect 28, wherein the vessel segmentation machine learning model is convolutional neural network.

Aspect 33. The computer-implemented method of aspect 28, further comprising:
  applying, by the one or more processors, to the received angiography images a de-noising process, a linear filtering process, an image size normalization process, and a pixel intensity normalization process.

Aspect 34. The computer-implemented method of aspect 28, wherein the fluid dynamics machine learning model comprises at least one network of the type: convolutional neural network (CNN), autoencoder, or long short-term memory (LSTM), or a graph-theory based reduced order model of flow and pressure.

Aspect 35. The computer-implemented method of aspect 28, wherein fluid dynamics machine learning model is a Navier Stokes informed deep learning framework configured to determine pressure data and velocity data over a 1D vessel space.

Aspect 36. The computer-implemented method of aspect 35, wherein the Navier Stokes informed deep learning framework comprises one or more methods of the type: Kalman Filtering, Physics-informed Neural Network, iterative assimilation algorithm based upon contrast arrival time at anatomical landmarks, and TIMI frame counting.

Aspect 37. The computer-implemented method of aspect 28, wherein fluid dynamics machine learning model is a graph-theory based reduced order model, obtained by defining a dense graph of discrepancies between ground truth data and a low-fidelity model of flow, given by a 1D non-linear theory model.

Aspect 38. The computer-implemented model of aspect 37, where the ground truth data used to define the dense graph can be either in silico simulations of 3D Navier-Stokes equations of in vivo data acquired in the catheterization laboratory.

Aspect 39. The computer-implemented model of aspect 37, where vertices of the dense graph are defined by exploring discrepancies between ground-truth data and a low-fidelity 1D non-linear models of flow include permutations of stenosis diameter, length, eccentricity, flow through the stenosis and a combination thereof.

Aspect 40. The computer-implemented model of aspect 37, where the graph-theory based reduced order model is obtained through non-local calculus, a deep neural network, or a direct traverse over the vertices of the generated graph.

Aspect 41. The computer-implemented model of aspect 37, where the graph-theory based reduced order model may be an algebraic equation or an ordinary or partial differential equation.

Aspect 41. The computer-implemented method of aspect 28, wherein determining the flow data over the sampling time period comprises determining pressure and flow velocity data for the one or more vessels over the sampling time period.

Aspect 43. The computer-implemented method of aspect 42, wherein the one or more vessels comprises a plurality of connected vessels.

Aspect 44. The computer-implemented method of aspect 28, wherein the computational fluid dynamics model comprises a graph-theory based reduced-order model simulations, with inputs given by the 1D segmented vessel tree geometric model, and boundary conditions on flow and pressure assimilated by the computational fluid dynamics machine learning model.

Aspect 45. The computer-implemented method of aspect 28, further comprising determining a lumped parameter model of flow for each of the one or more vessels.

Aspect 46. The computer-implemented method of aspect 28, further comprising:
determining fractional flow reserve (FFR), instantaneous wave-free ratio (iFR), or quantitative flow ratio (QFR) for the one or more vessels from the flow data; and
determining the state of vessel occlusion from the FFR, iFR or QFR for the one or more vessels.

Aspect 47. The computer-implemented method of aspect 46, further comprising:
determining coronary flow reserve (CFR) for the one or more vessels from the flow data, from one or more physiological states; and
determining the state of microvascular disease from the CFR for the one or more vessels.

Aspect 48. The computer-implemented method of aspect 28, wherein determining the state of vessel occlusion comprises determining a presence of stenosis in the one or more vessels.

Aspect 49. The computer-implemented method of aspect 28, further comprising: feeding a plurality of synthetic angiography images, a plurality of clinical angiography images, and a plurality of augmented angiography images to train the vessel segmentation machine learning model.

Aspect 50. A computing device configured to assessing CAD comprising: one or more processors and one or more computer-readable memories storing instructions that when executed cause the one or processors to: receive, by one or more processors, angiography image data of a vessel inspection region for a subject, wherein the angiography image data comprises angiography images captured over a sampling time period; apply, by the one or more processors, the angiography image data to a vessel segmentation machine learning model and generating, using the vessel segmentation machine learning model, two-dimensional (2D) segmented vessel images for the vessel inspection region; by the one or more processors, generate from the 2D segmented vessel images a three-dimensional (3D) segmented vessel tree geometric model of vessels within the vessel inspection region; and apply, by the one or more processors, the 3D segmented vessel tree model to a fluid dynamics-machine learning model to assimilate, using the fluid dynamics machine learning model, flow data over the sampling time period for one or more vessels within the vessel inspection region; apply, by the one or more processors, the 3D segmented vessel tree model and the assimilated flow data to a 3D, high-fidelity, computational fluid dynamics model; and determine, by the one or more processors, a state of vessel occlusion for the one or more vessels within the vessel inspection region.

Aspect 50. A computing device configured to assessing CAD comprising: one or more processors and one or more computer-readable memories storing instructions that when executed cause the one or processors to: receive, by one or more processors, a plurality of angiography images of a vessel inspection region for a subject, wherein the angiography images are captured over a sampling time period and wherein the vessel inspection region comprises one or more vessels; apply, by the one or more processors, the angiography images to a vessel segmentation machine learning model and generate, using the vessel segmentation machine learning model, two-dimensional (2D) segmented vessel images for the one or more vessels; by the one or more processors, generate, from the 2D segmented vessel images, a one-dimensional (1D) segmented vessel tree geometric model of the one or more vessels; apply, by the one or more processors, the 1D segmented vessel tree model to a fluid dynamics machine learning model to assimilate, using the fluid dynamics machine learning model, flow data over the sampling time period for the one or more vessels; apply, by the one or more processors, the 1D segmented vessel tree model and the assimilated flow data to a graph-theory based reduced order model based on computational fluid dynamics model; and determine, by the one or more processors, a state of vessel occlusion.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the target matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion such as a Contrast Agent Injection System shown in FIG. 2) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A computer-implemented method for assessing coronary artery disease, the method comprising:
    (a) receiving, by one or more processors, angiography image data of a vessel inspection region for a subject, wherein the angiography image data comprises angiography images captured over a sampling time period;
    (b) applying, by the one or more processors, the angiography image data to a vessel segmentation machine learning model and generating, using the vessel segmentation machine learning model, two-dimensional (2D) segmented vessel images for the vessel inspection region;
    (c) by the one or more processors, generating from the 2D segmented vessel images a three-dimensional (3D) segmented vessel tree geometric model of vessels within the vessel inspection region;
    (d) applying, by the one or more processors, the angiography images to a fluid dynamics machine learning model and assimilating flow data for the vessel inspection region over the sampling time period;
    (e) applying, by the one or more processors, the 3D segmented vessel tree geometric model and the assimilated flow data to a computational fluid dynamics model; and
    (f) determining, by the one or more processors, a state of vessel occlusion for one or more of the vessels within the vessel inspection region.

2. The computer-implemented method of claim 1, further comprising: determining, by the one or more processors, a state of microvascular disease for the one or more vessels within the vessel inspection region by performing (a)-(e) at least two different hemodynamic states.

3. The computer-implemented method of claim 1, wherein the vessel segmentation machine learning model is a convolutional neural network.

4. The computer-implemented method of claim 1, further comprising:
applying, by the one or more processors, to the received angiography image data at least one of a de-noising process, a linear filtering process, an image size normalization process, and a pixel intensity normalization process to produce filtered angiography image data.

5. The computer-implemented method of claim 4, further comprising:
feeding the filtered angiography image data to an angiography processing network (APN), trained to address in the angiography image data low contrast, presence of catheters, and/or presence of overlapping bonny bony structures.

6. The computer-implemented method of claim 5, further comprising:
feeding an output of the APN to a semantic image segmentation to produce automatic binary 2D segmented vessel images.

7. The computer-implemented method of claim 1, further comprising:
applying, by one or more processors, to the 3D segmented vessel tree geometric model at least one of a smoothing algorithm and a surface spline fitting algorithm.

8. The computer-implemented method of claim 1, generating the 3D segmented vessel tree geometric model by performing a back-projection the 2D segmented vessel images.

9. The computer-implemented method of claim 1, wherein the fluid dynamics machine learning model comprises at least one network of the type: convolutional neural network (CNN), autoencoder, or long short-term memory (LSTM).

10. The computer-implemented method of claim 1, wherein fluid dynamics machine learning model is a Navier Stokes informed deep learning framework configured to determine pressure data and velocity data over a 3D vessel space.

11. The computer-implemented method of claim 10, wherein the Navier Stokes informed deep learning framework comprises one or more methods of the type: Kalman Filtering, Physics-informed Neural Network, iterative assimilation algorithm based upon contrast arrival time at anatomical landmarks, and TIMI frame counting.

12. The computer-implemented method of claim 1, wherein assimilating the flow data over the sampling time period comprises determining pressure and flow velocity data for the one or more vessels over the sampling time period.

13. The computer-implemented method of claim 1, wherein assimilating the flow data over the sampling time period comprises determining pressure and flow velocity data for a plurality of connected vessels in the vessel inspection region.

14. The computer-implemented method of claim 1, wherein the computational fluid dynamics model comprises of one or more of:
multi-scale 3D Navier-Stokes simulations with reduced-order (lumped parameter) models; reduced-order Navier-Stokes (1D) simulations with reduced-order models; or
reduced-order models for the segmented vessel tree geometric models.

15. The computer-implemented method of claim 1, wherein the lumped parameter boundary condition parameters are determined by the fluid dynamics machine learning model for one or more vessels in the vessel inspection region.

16. The computer-implemented method of claim 15, further comprising determining a lumped parameter model of flow for a first vessel and determining a lumped parameter model of flow for each vessel branching from the first vessel.

17. The computer-implemented method of claim 10, further comprising additionally applying the 3D segmented vessel tree geometric model to the fluid dynamics machine learning model.

18. The computer-implemented method of claim 14, wherein the reduced-models are graph-theory or neural network based reduced order models.

19. A computer-implemented method for assessing coronary artery disease, the method comprising:
(a) receiving, by one or more processors, angiography image data of a vessel inspection region for a subject, wherein the angiography image data comprises angiography images captured over a sampling time period;
(b) applying, by the one or more processors, the angiography image data to a vessel segmentation machine learning model and generating, using the vessel segmentation machine learning model, two-dimensional (2D) segmented vessel images for the vessel inspection region;
(c) by the one or more processors, generating, from the 2D segmented vessel images, a one-dimensional (1D) segmented vessel tree geometric model of vessels within the vessel inspection region;
(d) applying, by the one or more processors, the angiography images to a fluid dynamics machine learning model and assimilating flow data for the vessel inspection region over the sampling time period;
(e) applying, by the one or more processors, the 1D segmented vessel tree geometric model and the assimilated flow data to a computational fluid dynamics model; and
(f) determining, by the one or more processors, a state of vessel occlusion for one or more of the vessels within the vessel inspection region.

20. The computer-implemented method of claim 19, wherein the computational fluid dynamics model is a graph-theory or neural network based reduced order model.

* * * * *